United States Patent
Onzon et al.

(10) Patent No.: US 12,482,068 B2
(45) Date of Patent: Nov. 25, 2025

(54) METHOD AND SYSTEM FOR DETERMINING AUTO-EXPOSURE FOR HIGH-DYNAMIC RANGE OBJECT DETECTION USING NEURAL NETWORK

(71) Applicant: TORC CND ROBOTICS, INC., Montreal (CA)

(72) Inventors: Emmanuel Luc Julien Onzon, Munich (DE); Felix Heide, Palo Alto, CA (US); Fahim Mannan, Montreal (CA)

(73) Assignee: TORC CND ROBOTICS, INC., Montreal (CA)

( * ) Notice: Subject to any disclaimer, the term of this patent is extended or adjusted under 35 U.S.C. 154(b) by 867 days.

(21) Appl. No.: 17/722,261

(22) Filed: Apr. 15, 2022

(65) Prior Publication Data

US 2022/0269910 A1   Aug. 25, 2022

Related U.S. Application Data

(63) Continuation-in-part of application No. 17/712,727, filed on Apr. 4, 2022, now Pat. No. 11,783,231,
(Continued)

(51) Int. Cl.
*G06T 5/50* (2006.01)
*G06F 18/241* (2023.01)
(Continued)

(52) U.S. Cl.
CPC ............... *G06T 5/50* (2013.01); *G06F 18/241* (2023.01); *G06F 18/24133* (2023.01);
(Continued)

(58) Field of Classification Search
CPC ............... G06F 18/241; G06F 18/2413; G06F 18/24133; G06N 3/045; G06N 3/084;
(Continued)

(56) References Cited

U.S. PATENT DOCUMENTS 6,919,892 B1   7/2005 Cheiky et al.
7,053,612 B2   5/2006 St. Pierre
(Continued)

FOREIGN PATENT DOCUMENTS

CN        106408030 A   *  2/2017  .......... G06F 18/2411
WO   WO-2014206503 A1  * 12/2014  ............... G06T 5/50

OTHER PUBLICATIONS

Zheng, Haitian, et al. "Learning high-level prior with convolutional neural networks for semantic segmentation." arXiv preprint arXiv: 1511.06988 (2015). (Year: 2015).*
(Continued)

*Primary Examiner* — Stephen R Koziol
*Assistant Examiner* — Benedict E Lee
(74) *Attorney, Agent, or Firm* — Armstrong Teasdale LLP

(57) ABSTRACT

An auto-exposure control is proposed for high dynamic range images, along with a neural network for exposure selection that is trained jointly, end-to-end with an object detector and an image signal processing (ISP) pipeline. Corresponding method and system for high dynamic range object detection are also provided.

21 Claims, 17 Drawing Sheets
(14 of 17 Drawing Sheet(s) Filed in Color)

Related U.S. Application Data which is a continuation of application No. 16/927,741, filed on Jul. 13, 2020, now Pat. No. 11,295,176, which is a continuation of application No. 16/025,776, filed on Jul. 2, 2018, now Pat. No. 10,713,537.

(60) Provisional application No. 63/175,505, filed on Apr. 15, 2021, provisional application No. 62/528,054, filed on Jul. 1, 2017.

(51) Int. Cl.
| | |
|---|---|
| *G06F 18/2413* | (2023.01) |
| *G06N 3/045* | (2023.01) |
| *G06N 3/084* | (2023.01) |
| *G06N 20/00* | (2019.01) |
| *G06T 5/60* | (2024.01) |
| *G06T 5/73* | (2024.01) |
| *G06V 10/44* | (2022.01) |

(52) U.S. Cl.
CPC ............ *G06N 3/045* (2023.01); *G06N 3/084* (2013.01); *G06N 20/00* (2019.01); *G06T 5/60* (2024.01); *G06T 5/73* (2024.01); *G06V 10/454* (2022.01); *G06T 2207/20081* (2013.01); *G06T 2207/20084* (2013.01); *G06T 2207/20182* (2013.01)

(58) Field of Classification Search
CPC . G06N 20/00; G06N 3/08; G06T 5/00; G06T 5/50; G06T 5/73; G06T 2207/20081; G06T 2207/20084; G06T 2207/20182; G06T 5/60; G06T 2207/20208; G06V 10/44; G06V 10/454; G06V 40/13; G06V 40/145; G06V 10/147; G06V 10/50; G06V 10/774; G06V 10/778; G06V 40/19; G06V 10/82; G06V 20/56
See application file for complete search history.

(56) References Cited

U.S. PATENT DOCUMENTS

| | | | |
|---|---|---|---|
| 7,117,916 B2 | 10/2006 | Johnston | |
| 7,570,194 B2 | 8/2009 | Galati | |
| 7,821,266 B2 | 10/2010 | Feiweier | |
| 8,160,149 B2 | 4/2012 | Demos | |
| 8,295,565 B2 | 10/2012 | Gu | |
| 8,339,475 B2* | 12/2012 | Atanassov | G06T 5/40 348/229.1 |
| 8,352,400 B2 | 1/2013 | Hoffberg et al. | |
| 8,401,248 B1 | 3/2013 | Moon | |
| 8,451,504 B2 | 5/2013 | Xu et al. | |
| 8,462,996 B2 | 6/2013 | Moon | |
| 8,525,287 B2* | 9/2013 | Tian | H10F 30/2275 257/457 |
| 8,620,852 B1 | 12/2013 | Kipersztok et al. | |
| 8,675,105 B2 | 3/2014 | Lansel | |
| 8,676,731 B1 | 3/2014 | Sathyanarayana et al. | |
| 8,687,879 B2 | 4/2014 | Cotman | |
| 8,724,910 B1 | 5/2014 | Pillai | |
| 8,948,537 B2* | 2/2015 | Rempel | G06T 5/90 345/589 |
| 9,113,846 B2 | 8/2015 | Zinaty et al. | |
| 9,172,889 B2* | 10/2015 | Li | H04N 25/589 |
| 9,275,445 B2* | 3/2016 | Granados | G06T 5/50 |
| 9,654,699 B2* | 5/2017 | Shen | H04N 25/589 |
| 9,852,492 B2 | 12/2017 | Saberian et al. | |
| 9,881,234 B2* | 1/2018 | Huang | G06F 18/2163 |
| 9,928,418 B2 | 3/2018 | Segalovitz et al. | |
| 9,965,863 B2 | 5/2018 | Xu et al. | |
| 9,978,003 B2 | 5/2018 | Sachs et al. | |
| 9,984,325 B1 | 5/2018 | Kim et al. | |
| 10,460,231 B2* | 10/2019 | Zhang | G06V 30/19173 |
| 10,565,734 B2* | 2/2020 | Bevensee | G06T 7/521 |
| 11,055,827 B2* | 7/2021 | Bouzaraa | G06T 5/90 |
| 2005/0057670 A1* | 3/2005 | Tull | G06T 1/0007 348/241 |
| 2009/0109306 A1* | 4/2009 | Shan | H04N 23/70 358/525 |
| 2017/0011710 A1 | 1/2017 | Pajak et al. | |

OTHER PUBLICATIONS

Merianos et al. "A hybrid multiple exposure image fusion approach for HDR image synthesis." 2016 IEEE International Conference on Imaging Systems and Techniques (IST). IEEE, 2016. (Year: 2016).*

Chen, Liang-Chieh, et al. "Deeplab: Semantic image segmentation with deep convolutional nets, atrous convolution, and fully connected crfs." IEEE transactions on pattern analysis and machine intelligence 40.4 (2017): 834-848. (Year: 2017).*

Granados, Miguel, et al. "Optimal HDR reconstruction with linear digital cameras." 2010 IEEE computer society conference on computer vision and pattern recognition. IEEE, 2010. (Year: 2010).*

De Neve, Saartje, Bart Goossens, and Wilfried Philips. "An improved HDR image synthesis algorithm." 2009 16th IEEE International Conference on Image Processing (ICIP). IEEE, 2009. (Year: 2009).*

Li, Shuda, et al. "HDRFusion: HDR SLAM using a low-cost auto-exposure RGB-D sensor." 2016 Fourth International Conference on 3D Vision (3DV). IEEE, 2016. (Year: 2016).*

Ram Prabhakar, K., V. Sai Srikar, and R. Venkatesh Babu. "Deepfuse: A deep unsupervised approach for exposure fusion with extreme exposure image pairs." Proceedings of the IEEE international conference on computer vision. 2017. (Year: 2017).*

Abadi et al., "TensorFlow: Large-scale machine learning on heterogeneous systems", 2015, pp. 1-19.

Agostinelli, et al., "Adaptive Multi-Column Deep Neural Networks with Application to Robust Image Denoising", Advances in Neural Information Processing Systems, 1493-1501, 2013, pp. 1-9.

Ahmed, et al., "Discrete Cosine Transform", IEEE Transactions on Computers C-23, 1, 1974, pp. 90-93.

Beck, et al., "A Fast Iterative Shrinkage-Thresholding Algorithm for Linear Inverse Problems", SIAM Journal on Imaging Sciences 2, 1, 2009, pp. 183-202.

Boyd, et al., "Convex Optimization", Cambridge University Press, 2004.

Boyd, et al., "Distributed Optimization and Statistical Learning via the Alternating Direction Method of Multipliers", Foundations and Trends in Machine Learning, 3, 1, 2010, pp. 1-122.

Bruck, "An Iterative Solution of a Variational Inequality for Certain Monotone Operators in Hilbert Space", Bulletin of the American Mathematical Society, 81, 5, Sep. 1975, pp. 890-892.

Buades, et al., "A non-local algorithm for image denoising", Proc. IEEE CVPR, vol. 2, 2005, pp. 60-65.

Burger, et al., "Image denoising: Can plain Neural Networks compete with BM3D?", Proceedings of IEEE Conference on Computer Vision and Pattern Recognition, 2012, pp. 2392-2399.

Chakrabarti, "A Neural Approach to Blind Motion Deblurring", Proceedings of the European Conference on Computer Vision, 2016.

Chambolle, et al., "A first-order primal-dual algorithm for convex problems with applications to imaging", Journal of Mathematical Imaging and Vision 40, 1, 2010, pp. 120-145.

Chen, et al., "Trainable Nonlinear Reaction Diffusion: A Flexible Framework for Fast and Effective Image Restoration", IEEE Transactions on Pattern Analysis and Machine Intelligence, vol. XX, No. XX, 2016, arXiv:1508:.02848v2 [cs.CV] Aug. 20, 2016, pp. 1-15.

Chen, et al., "On learning optimized reaction diffusion processes for effective image restoration", Proceedings of the IEEE Conference on Computer Vision and Pattern Recognition, 2015, pp. 5261-5269.

Chen, et al., "Joint Visual Denoising and Classification Using Deep Learning", Proceedings of the IEEE International Conference on Image Processing, 2016, pp. 3673-3677.

Da Costa, et al., "An empirical study on the effects of different types of noise in image classification tasks", arXiv:1609.02781v1 [cs.CV] Sep. 9, 2016.

(56) References Cited

OTHER PUBLICATIONS

Danielyan, et al., "BM3D frames and variational image deblurring", IEEE Trans. Image Processing 21, 4, 2011, arXiv:1106.6180v1 [math.OC] Jun. 30, 2011, pp. 1715-1728.
Daubechies, "Ten Lectures of Wavelets", vol. 61, SIAM, 1992.
Deng, et al., "ImageNet: a Large-Scale Hierarchical Image Database", Conference Paper in Proceedings, CVPR, IEEE Computer Society Conference on Computer Vision and Pattern Recognition, Jun. 2009, pp. 248-255.
Dodge, et al., "Understanding How Image Quality Affects Deep Neural Networks", arXiv:1604.04004v2 [cs.CV] Apr. 21, 2016, pp. 1-6.
Ramanath, et al., "Color Image Processing Pipeline in Digital Still Cameras", IEEE Signal Processing Magazine 22, 1, 2005, pp. 34-43.
Roth, et al., "Field of Experts: A Framework for Learning Image Priors", IEEE Computer Society Conference on Computer Vision and Pattern Recognition (CVPR'05), vol. 2, 2005, pp. 860-867.
Rudin, et al., "Nonlinear total variation based noise removal algorithms", Physica D: Nonlinear Phenomena 60, 14, 1992, pp. 259-268.
Schmidt, et al., "Shrinkage Fields for Effective Image Restoration", Proceedings of the IEEE Conference on Computer Vision and Pattern Recognition, 2014, pp. 2774-2781.
Schuler, et al., "A machine learning approach for non-blind image deconvolution", Proceedings of the IEEE Conference on Computer Vision and Pattern Recognition, 2013, pp. 1067-1074.
Schuler, et al., "Learning to Deblur", NIPS 2014 Deep Learning and Representation Learning Workshop, arXiv:1406.7444v1 [cs.CV] Jun. 28, 2014, pp. 1-28.
Shao, et al., "From Heuristic Optimization to Dictionary Learning: A Review and Comprehensive Comparison of Image Denoising Algorithms", IEEE Transactions on Cybernetics, vol. 44, No. 7, Jul. 2014, pp. 1001-1013.
Szegedy, et al., "Inception-v4, Inception-ResNet and the Impact of Residual Connections on Learning", Proceedings of the Thirty-First AAAI Conference on Artificial Intelligence (AAAI-17), 2016, pp. 4278-4284.
Tang, et al., "Deep networks for robust visual recognition". Proceedings of the International Conference on Machine Learning, 2010, pp. 1055-1062.
Tang, et al., "Robust Boltzmann Machines for Recognition and Denoising", 2012 IEEE Conference on Computer Vision and Pattern Recognition (CVPR), pp. 2264-2271.
Vasiljevic, et al., "Examining the Impact of Blur on Recognition by Convolutional Networks", arXiv:1611.05760v2 [cs.CV] May 30, 2017, pp. 1-10.
Wang, et al., "Proximal Deep Structured Models", Advances in Neural Information Processing Systems 29, 2016, pp. 865-873.
Xie, et al., "Image Denoising and Inpainting with Deep Neural Networks", Proceedings of the International Conference on Neural Information Processing Systems, 2012, pp. 341-349.
Xu, et al., "Deep Convolutional Neural Network for Image Deconvolution", Advances in Neural Information Processing Systems, 2014, pp. 1790-1798.
Zhang, et al., "Color demosaicking by local directional interpolation and nonlocal adaptive thresholding", Journal of Electronic Imaging, 20(2), 023016, 2011.
Zhang, et al., "Learning Fully Convolutional Networks for Iterative Non-blind Deconvolution", arXiv preprint arXiv:1611.06495, 2016.
Zhang, et al., "Beyond a Gaussian Denoiser: Residual Learning of Deep CNN for Image Denoising", arXiv:1608.03981v1 [cs.CV] Aug. 13, 2016.
EMVA 1288 Standard for Characterization of Image Sensors and Cameras, Release 3.1, Dec. 30, 2016, Issued by European Machine Vision Association.
Glorot, et al., " Understanding the difficulty of training deep feedforward neural networks", Proceedings of the 13th International Conference on Artificial Intelligence and Statistics (AISTATS) 2010, vol. 9 of JLMR: W&CP 9, pp. 249-256.
CA Examiner's Report, Jun. 18, 2024.
ARM Mali C71, 2020 (accessed Nov. 11, 2020).
T Asatsuma, Y Sakano, S Iida, M Takami, I Yoshiba, N Ohba, H Mizuno, T Oka, K Yamaguchi, A Suzuki, et al. Sub-pixel architecture of cmos image sensor achieving over 120 db dynamic range with less motion artifact characteristics. In Proceedings of the 2019 International Image Sensor Workshop, 2019.
European Machine Vision Association. Emva standard 1288, standard for characterization of image sensors and cameras, release 3.1. 2016.
Sebastiano Battiato, Arcangelo Ranieri Bruna, Giuseppe Messina, and Giovanni Puglisi. Image processing for embedded devices. Bentham Science Publishers, 2010.
Michael S Brown and SJ Kim. Understanding the in-camera image processing pipeline for computer vision. 2015.
Vladimir Bychkovsky, Sylvain Paris, Eric Chan, and Frédo Durand. Learning photographic global tonal adjustment with a database of input/output image pairs. In CVPR 2011, pp. 97-104. IEEE, 2011.
Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In Proceedings of the IEEE conference on computer vision and pattern recognition, pp. 3213-3223, 2016.
Arnaud Darmont. High dynamic range imaging: sensors and architectures, second edition. 2019.
Paul E. Debevec and Jitendra Malik. Recovering high dynamic range radiance maps from photographs. In SIGGRAPH '08, 1997.
Zhushun Ding, Xin Chen, Zhe Jiang, and Cheng Tan. Adaptive exposure control for image-based visual-servo systems using local gradient information. JOSA A, 37(1):56-62, 2020.
Frédéric Dufaux, Patrick Le Callet, Rafal Mantiuk, and Marta Mrak. High dynamic range video: from acquisition, to display and applications. Academic Press, 2016.
Gabriel Eilertsen, Joel Kronander, Gyorgy Denes, Rafał K Mantiuk, and Jonas Unger. Hdr image reconstruction from a single exposure using deep cnns. ACM Transactions on Graphics (TOG), 36(6):178, 2017.
Konstantina Fotiadou, Grigorios Tsagkatakis, and Panagiotis Tsakalides. Snapshot high dynamic range imaging via sparse representations and feature learning. IEEE Transactions on Multimedia, 2019.
Orazio Gallo, Natasha Gelfandz, Wei-Chao Chen, Marius Tico, and Kari Pulli. Artifact-free high dynamic range imaging. 2009 IEEE International Conference on Computational Photography (ICCP), pp. 1-7, 2009.
Andreas Geiger, Philip Lenz, and Raquel Urtasun. Are we ready for autonomous driving? the kitti vision benchmark suite. In 2012 IEEE Conference on Computer Vision and Pattern Recognition, pp. 3354-3361. IEEE, 2012.
Michaël Gharbi, Jiawen Chen, Jonathan T Barron, Samuel W Hasinoff, and Frédo Durand. Deep bilateral learning for real-time image enhancement. ACM Transactions on Graphics (TOG), 36(4):118, 2017.
Ross Girshick. Fast r-cnn. In Proceedings of the IEEE international conference on computer vision, pp. 1440-1448, 2015.
Miguel Granados, Kwang In Kim, James Tompkin, and Christian Theobalt. Automatic noise modeling for ghost-free hdr reconstruction. ACM Trans. Graph., 32:201:1-201:10, 2013.
Michael D. Grossberg and Shree K. Nayar. High dynamic range from multiple images: Which exposures to combine? 2003.
Dong Guo, Yuan Cheng, Shaojie Zhuo, and Terence Sim. Correcting over-exposure in photographs. In 2010 IEEE Computer Society Conference on Computer Vision and Pattern Recognition, pp. 515-521. IEEE, 2010.
Samuel W. Hasinoff, Frédo Durand, and William T. Freeman. Noise-optimal capture for high dynamic range photography. 2010 IEEE Computer Society Conference on Computer Vision and Pattern Recognition, pp. 553-560, 2010.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.

(56) References Cited

OTHER PUBLICATIONS

Jun Hu, Orazio Gallo, Kari Pulli, and Xiaobai Sun. Hdr deghosting: How to deal with saturation? 2013 IEEE Conference on Computer Vision and Pattern Recognition, pp. 1163-1170, 2013.
S Iida, Y Sakano, T Asatsuma, M Takami, I Yoshiba, N Ohba, H Mizuno. T Oka, K Yamaguchi, A Suzuki, et al. A 0.68 e-rms random-noise 121db dynamic-range sub-pixel architecture cmos image sensor with led flicker mitigation. In 2018 IEEE International Electron Devices Meeting (IEDM), pp. 10-12. IEEE, 2018.
Manuel Innocent, Angel Rodriguez, Deb Guruaribam, Muhammad Rahman, Marc Sulfridge, Swarnal Borthakur, Bob Gravelle, Takayuki Goto, Nathan Dougherty, Bill Desjardin, et al. Pixel with nested photo diodes and 120 db single exposure dynamic range. In International Image Sensor Workshop, pp. 95-98, 2019.
Neel Joshi, Wojciech Matusik, Edward H Adelson, and David J Kriegman. Personal photo enhancement using example images. ACM Trans. Graph., 29(2):12-1, 2010.
Nima Khademi Kalantari and Ravi Ramamoorthi. Deep high dynamic range imaging of dynamic scenes. ACM Trans. Graph., 36:144:1-144:12, 2017.
Nima Khademi Kalantari and Ravi Ramamoorthi. Deep hdr video from sequences with alternating exposures. Comput. Graph. Forum, 38:193-205, 2019.
Nima Khademi Kalantari, Eli Shechtman, Connelly Barnes, Soheil Darabi, Dan B. Goldman, and Pradeep Sen. Patch- based high dynamic range video. ACM Trans. Graph., 32:202:1-202:8. 2013.
Sing Bing Kang, Ashish Kapoor, and Dani Lischinski. Personalization of image enhancement. In 2010 IEEE Computer Society Conference on Computer Vision and Pattern Recognition, pp. 1799-1806. IEEE, 2010.
Sing Bing Kang, Matthew Uyttendaele, Simon A. J. Winder, and Richard Szeliski. High dynamic range video. ACM Trans. Graph., 22:319-325, 2003.
Wen-Chung Kao, Chien-Chih Hsu, Chih-Chung Kao, and Shou-Hung Chen. Adaptive exposure control and real-time image fusion for surveillance systems. In 2006 IEEE international symposium on circuits and systems, pp. 4-pp. IEEE, 2006.
Erum Arif Khan, Ahmet Oguz Akyüz, and Erik Reinhard. Ghost removal in high dynamic range images. 2006 International Conference on Image Processing, pp. 2005-2008, 2006.
June-Sok Lee, You-Young Jung, Byung-Soo Kim, and Sung-Jea Ko. An advanced video camera system with robust af, ae, and awb control. IEEE Transactions on Consumer Electronics, 47(3):694-699, 2001.
Siyeong Lee, Gwon Hwan An, and Suk-Ju Kang. Deep chain hdri: Reconstructing a high dynamic range image from a single low dynamic range image. IEEE Access, 6:49913-49924, 2018.
Siyeong Lee, Gwon Hwan An, and Suk-Ju Kang. Deep recursive hdri: Inverse tone mapping using generative adversarial networks. In The European Conference on Computer Vision (ECCV), Sep. 2018.
Tzu-Mao Li, Michaël Gharbi, Andrew Adams, Fredo Durand, and Jonathan Ragan-Kelley. Differentiable programming for image processing and deep learning in halide. ACM Transactions on Graphics (TOG), 37(4):1-13, 2018.
Tsung-Yi Lin, Michael Maire, Serge Belongie, James Hays, Pietro Perona, Deva Ramanan, Piotr Dollár, and C Lawrence Zitnick. Microsoft coco: Common objects in context. In European conference on computer vision, pp. 740-755. Springer, 2014.
Ce Liu. Exploring new representations and applications for motion analysis. PhD thesis. 2009.
Steve Mann and Rosalind W. Picard. Being 'undigital' with digital cameras: extending dynamic range by combining differently exposed pictures. 1994.
Demetris Marnerides, Thomas Bashford-Rogers, Jonathan Hatchett, and Kurt Debattista. Expandnet: A deep convolutional neural network for high dynamic range expansion from low dynamic range content. CoRR, abs/1803.02266, 2018.
Mitsuhito Mase, Shoji Kawahito, Masaaki Sasaki, Yasuo Wakamori, and Masanori Furuta. A wide dynamic range cmos image sensor with multiple exposure-time signal outputs and 12-bit column-parallel cyclic a/d converters. IEEE Journal of Solid-State Circuits, 40(12):2787-2795, 2005.
Belen Masia and Diego Gutierrez. Content-aware reverse tone mapping. In 2016 International Conference on Artificial Intelligence: Technologies and Applications. Atlantis Press, 2016.
Tom Mertens, Jan Kautz, and Frank Van Reeth. Exposure fusion: A simple and practical alternative to high dynamic range photography. Comput. Graph. Forum, 28:161-171, 2009.
Jun Ohta. Smart CMOS image sensors and applications. CRC press, 2020.
SangHyun Park, GyuWon Kim, and JaeWook Jeon. The method of auto exposure control for low-end digital camera. In 2009 11th International Conference on Advanced Communication Technology, vol. 3, pp. 1712-1714. IEEE, 2009.
Jonathan B. Phillips and Henrik Eliasson. Camera Image Quality Benchmarking. Wiley Publishing, 1st edition, 2018.
Erik Reinhard, Greg Ward, Summant Pattanaik, Paul E. Debevec, Wolfgang Heidrich, and Karol Myszkowski. High dynamic range imaging: Acquisition, display, and image-based lighting. 2010.
Shaoqing Ren, Kaiming He, Ross Girshick, and Jian Sun. Faster r-cnn: Towards real-time object detection with region proposal networks. In Advances in neural information processing systems, pp. 91-99, 2015.
Simon Schulz, Marcus Grimm, and Rolf-Rainer Grigat. Using brightness histogram to perform optimum auto exposure. WSEAS Transactions on Systems and Control, 2(2):93, 2007.
Pradeep Sen, Nima Khademi Kalantari, Maziar Yaesoubi, Soheil Darabi, Dan B. Goldman, and Eli Shechtman. Robust patch-based hdr reconstruction of dynamic scenes. ACM Trans. Graph., 31:203:1-203:11, 2012.
Inwook Shim, Tae-Hyun Oh, Joon-Young Lee, Jinwook Choi, Dong-Geol Choi, and In So Kweon. Gradient-based camera exposure control for outdoor mobile platforms. IEEE Transactions on Circuits and Systems for Video Technology, 29(6):1569-1583, 2018.
Arthur Spivak, Alexander Belenky, Alexander Fish, and Orly Yadid-Pecht. Wide-dynamic-range cmos image sensors—comparative performance analysis. IEEE transactions on electron devices, 56(11):2446-2461, 2009.
Yuanhang Su and C-C Jay Kuo. Fast and robust camera's auto exposure control using convex or concave model. In 2015 IEEE International Conference on Consumer Electronics (ICCE), pp. 13-14. IEEE, 2015.
Yuanhang Su, Joe Yuchieh Lin, and C-C Jay Kuo. A model-based approach to camera's auto exposure control. Journal of Visual Communication and Image Representation, 36:122-129, 2016.
Okan Tarhan Tursun, Ahmet Oğuz Akyüz, Aykut Erdem, and Erkut Erdem. The state of the art in hdr deghosting: A survey and evaluation. In Computer Graphics Forum, vol. 34, pp. 683-707. Wiley Online Library, 2015.
Sergey Velichko, Scott Johnson, Dan Pates, Chris Silsby, Cornelis Hoekstra, Ray Mentzer, and Jeff Beck. 140 db dynamic range sub-electron noise floor image sensor. Proceedings of the HISW, 2017.
Quoc Kien Vuong, Se-Hwan Yun, and Suki Kim. A new auto exposure and auto white-balance algorithm to detect high dynamic range conditions using cmos technology. In Proceedings of the world congress on engineering and computer science, pp. 22-24. San Francisco, USA: IEEE, 2008.
Trygve Willassen, Johannes Solhusvik, Robert Johansson, Sohrab Yaghmai, Howard Rhodes, Sohei Manabe, Duli Mao, Zhiqiang Lin, Dajiang Yang, Orkun Cellek, et al. A 1280x 1080 4.2 µm split-diode pixel hdr sensor in 110 nm bsi cmos process. In Proceedings of the International Image Sensor Workshop, Vaals, The Netherlands, pp. 8-11, 2015.
Orly Yadid-Pecht and Eric R Fossum. Wide intrascene dynamic range cmos aps using dual sampling. IEEE Transactions on Electron Devices, 44(10):1721-1723, 1997.
Lucie Yahiaoui, Jonathan Horgan, Senthil Yogamani, Ciaran Hughes, and Brian Deegan. Impact analysis and tuning strategies for camera image signal processing parameters in computer vision. In Irish Machine Vision and Image Processing conference (IMVIP), 2011.

(56) References Cited

OTHER PUBLICATIONS

David XD Yang and Abbas El Gamal. Comparative analysis of snr for image sensors with enhanced dynamic range. In Sensors, cameras, and systems for scientific/industrial applications, vol. 3649, pp. 197-211. International Society for Optics and Photonics, 1999.
Huan Yang, Baoyuan Wang, Noranart Vesdapunt, Minyi Guo, and Sing Bing Kang. Personalized exposure control using adaptive metering and reinforcement learning. IEEE transactions on visualization and computer graphics, 25(10):2953-2968, 2018.
Ming Yang, Ying Wu, James Crenshaw, Bruce Augustine, and Russell Mareachen. Face detection for automatic exposure control in handheld camera. In Fourth IEEE International Conference on Computer Vision Systems (ICVS'06), pp. 17-17. IEEE, 2006.
Alan C. Bovik, "Basic Gray-Level Image Processing", Handbook of Image and Video Processing, Academic Press (2000), Chapters 1-2.
Ronneberger, et al., "U-Net: Convolutional Networks for Biomedical Image Segmentation", Medical Image Computing and Computer-Assisted Intervention (MICCAI), Springer, LNCS, vol. 9351, 2015, pp. 234-241.
Ioffe, et al., "Batch Normaliztion: Accelerating Deep Network Training by Reducing Internal Covariate Shift", (Submitted on Feb. 11, 2015 (v1), last revised Mar. 2, 2015 (this version, v3), arXiv:1502.03167v3 [cs.LG].
Diamond et al., "Unrolled Optimization with Deep Priors", arXiv:1705.08041v1 [cs.CV] May 22, 2017.
Quan et al., "A New Poisson Noisy Image Denoising Method Based on the Anscombe Transformation", http://worldcomp-proceedings.com/proc/p2012/IPC7929.pdf.
Kingma, et al., "Adam: A Method for Stochastic Optimization", ICLR 2015, arXiv:1412.6980v9 [cs.LG] Jan. 30, 2017.
Tieleman, et al, 2012, Lecture 6.5-rmsprop: Divide the gradient by a running average of its recent magnitude. COURSERA: Neural Networks for Machine Learning 4, 2.
Glowinski, et al., 1975, Sur l'approximation, par elements finis d'ordre un, et la resolution,d'une classe de problemes de dirichlet non lineaires. Revue francaise d'automatique, informatique,operationnelle. Analyse numerique 9, 2, 41-76.
Dong, et al., "Learning a Deep Convolutional Network for Image Super-Resolution", Proceedings of the European Conference on Computer Vision, 2014, pp. 184-199.
Makitalo, et al., "Optimal Inversion of the Generalized Anscombe Transformation for Poisson-Guassian Noise", IEEE Transactions on Image Processing, vol. 22, No. 1, Jan. 2013, pp. 91-103.
Foi, et al., "Practical Poissonian-Gaussian noise modeling and fitting for single-image raw-data", IEEE Trans. Image Process., 17, 10, (1737-1754), pp. 1-18.
Foi, "Clipped noisy images: Heteroskedastic modeling and practical denoising", Signal Processing 89, 12, 2009, pp. 2609-2629.
Geman, et al., "Nonlinear Image Recovery with Half-Quadratic Regularization", IEEE Trans. Image Processing 4, 7, 1993, pp. 932-946.
Gharbi, et al., "Deep Joint Demosaicking and Denoising", ACM Transactions on Graphics (TOG) vol. 35, No. 6, Article 191, Nov. 2016.
Pock, et al., " An Algorithm for Minimizing the Mumford-Shah Functional", IEEE International Conference on Computer Vision, Nov. 2009.
Heide, et al., "FlexISP: A Flexible Camera Image Processing Framework", ACM Trans. Graph., (SIGGRAPH Asia) 33, 6, 2014.
Heide, et al., "Proximal: Efficient Image Optimization using Proximal Algorithms", ACM Trans. Graph., vol. 35, No. 4. Article 84, Jul. 2016.
"Photography—Electronic still picture imaging—Resolution and spatial frequency responses", ISO 12233:2014.
Jain, et al., "Natural Image Denoising with Convolutional Networks", Advances in Neural Information Processing Systems, 2009, pp. 769-776.
Jalalvand, et al., "Towards Using Reservoir Computing Networks for Noise-Robust Image Recognition", Proceedings of the International Joint Conference on Neural Networks, 2016, pp. 1666-1672.
Jin, et al., "Deep Convolutional Neural Network for Inverse Problems in Imaging", arXiv:1611.03679v1 [cs.CV] Nov. 11, 2016, pp. 1-20.
Kim, et al., "Accurate Image Super-Resolution Using Very Deep Convolutional Networks", Proceedings of the IEEE Conference on Computer Vision and Pattern Recognition, 2016, pp. 1646-1654.
Martin, et al., "A Database of Human Segmented Natural Images and its Application to Evaluating Segmentation Algorithms and Measuring Ecological Statistics", Proc., 8th Int'l Conf. Computer Vision, vol. 2, Report No. UCB/CSD-1-1133, 2001, pp. 416-423.
Mosleh, et al., "Camera Intrinsic Blur Kernel Estimation: A Reliable Framework", IEEE Conference on Computer Vision and Pattern Recognition (CVPR), 2015, pp. 4961-4968.
Ochs, et al., "Bilevel Optimization with Nonsmooth Lower Level Problems", International Conference on Scale Space and Variational Methods in Computer Vision, Springer, 2015, pp. 654-665.
Ochs, et al., "Techniques for Gradient Based Bilevel Optimization with Nonsmooth Lower Level Promblems", Journal of Mathematical Imaging and Vision, arXiv:1602.07080v2 [math.OC] Apr. 26, 2016, pp. 1-19.

\* cited by examiner

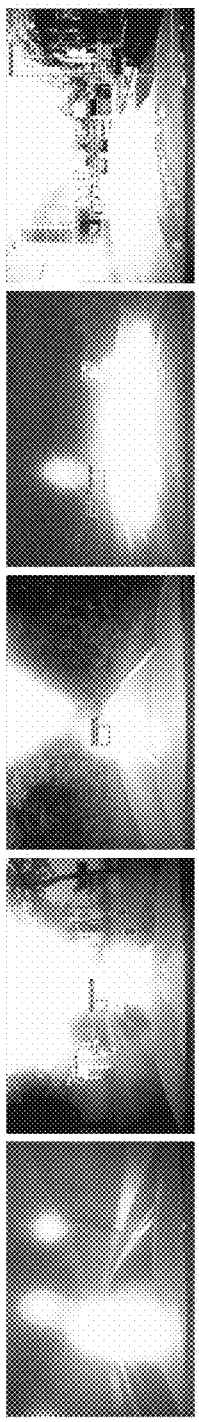
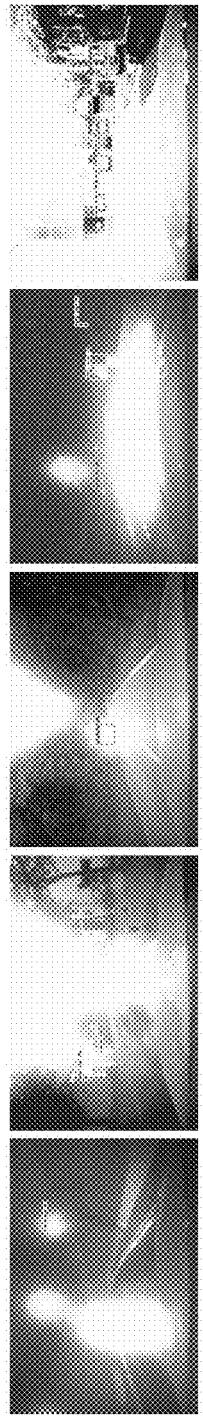
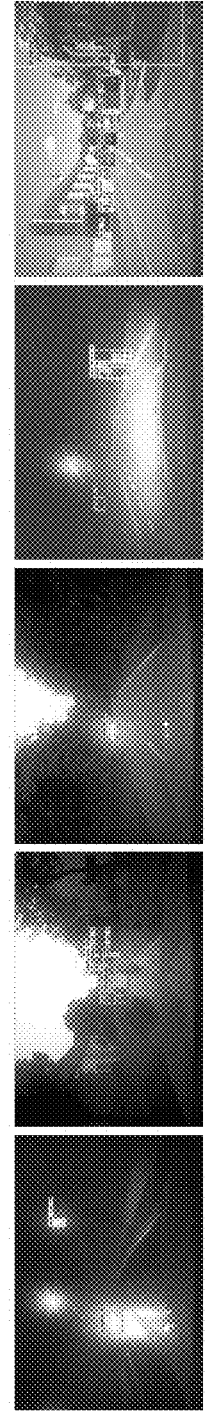
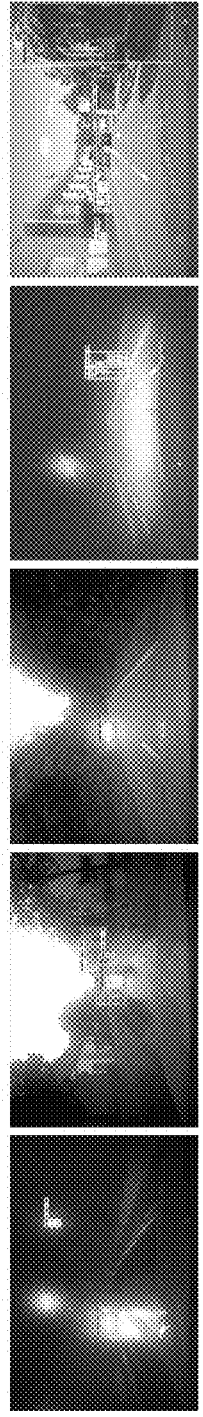

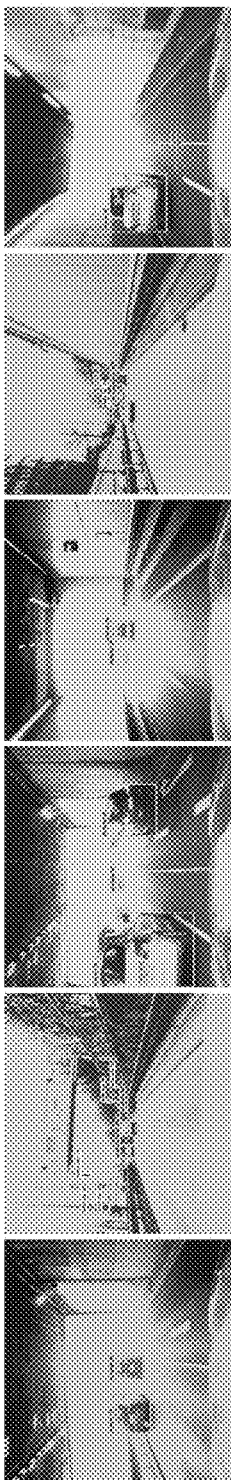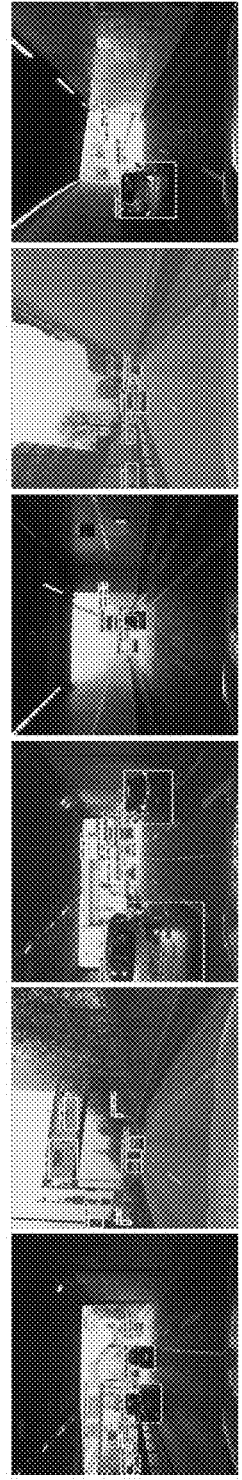

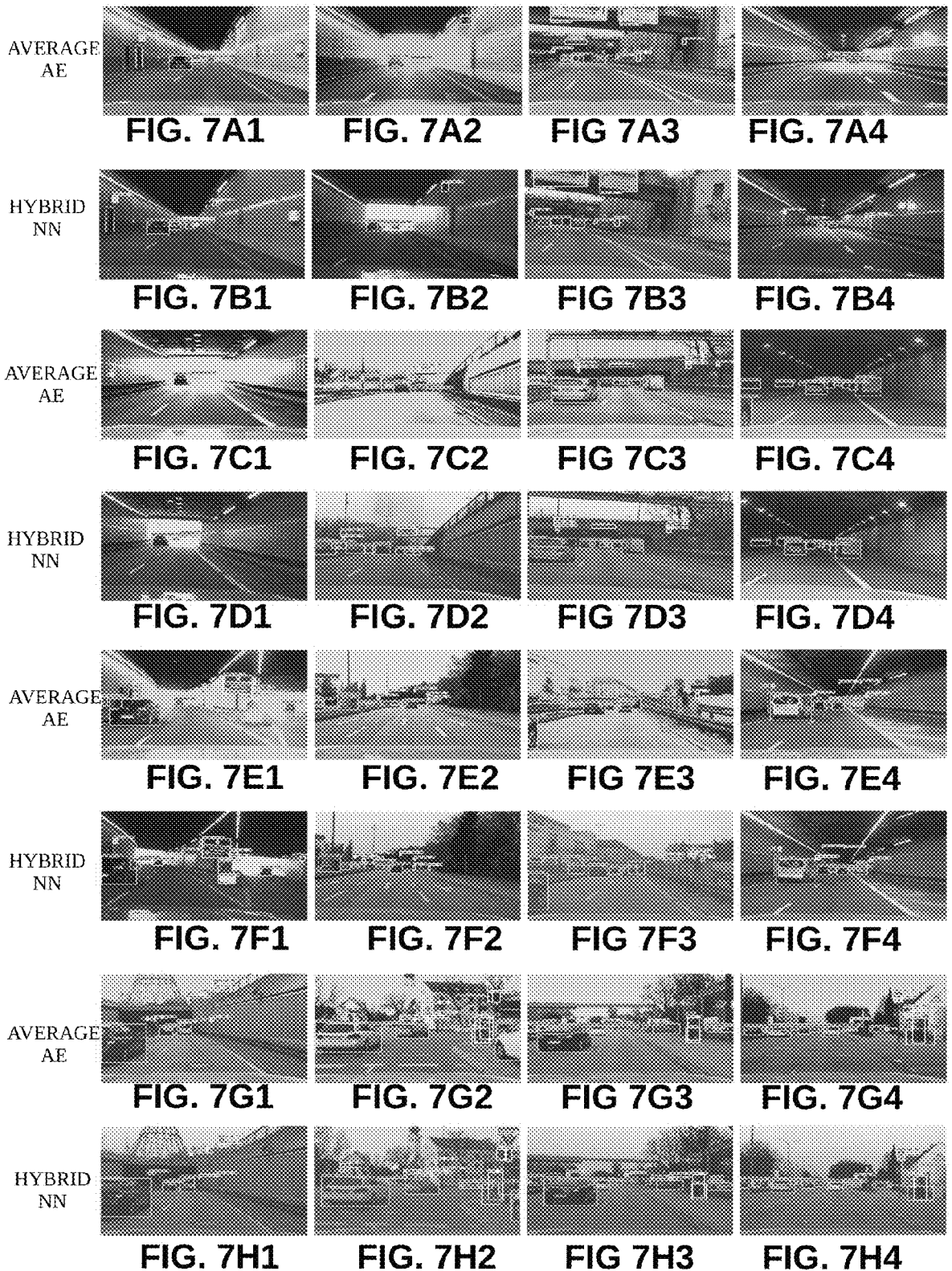

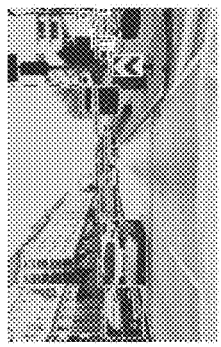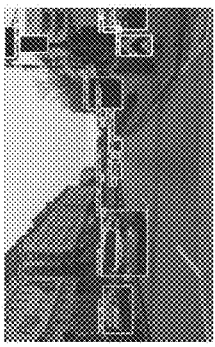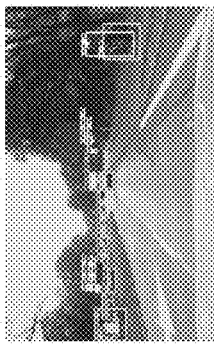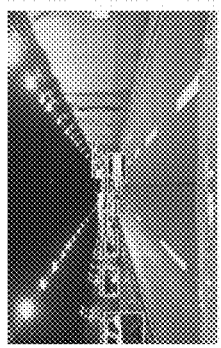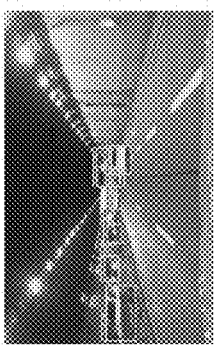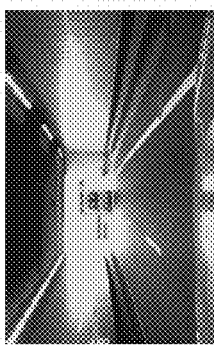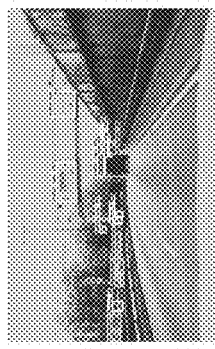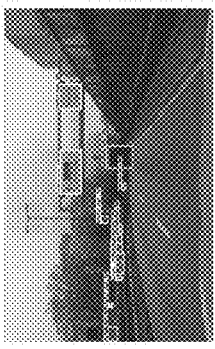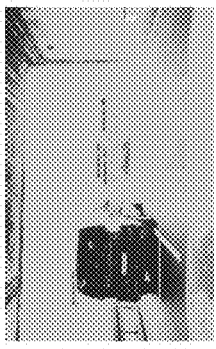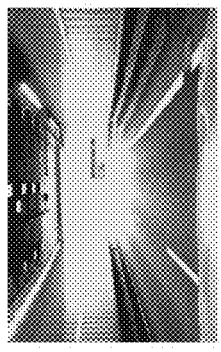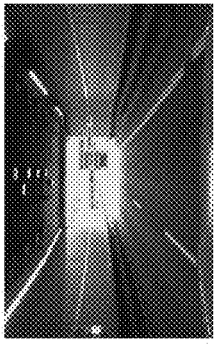

METHOD AND SYSTEM FOR DETERMINING AUTO-EXPOSURE FOR HIGH-DYNAMIC RANGE OBJECT DETECTION USING NEURAL NETWORK

CROSS REFERENCE TO RELATED APPLICATIONS

The present application (ALX-009-US) claims benefit from U.S. provisional patent application Ser. No. 63/175,505, filed on Apr. 15, 2021 (ALX-009-US-prov).

The present application (ALX-009-US) is also a continuation-in-part of U.S. patent application Ser. No. 17/712,727 filed on Apr. 4, 2022 (ALX-004-US-CON2). ALX-004-US-CON2 is a continuation of U.S. patent application Ser. No. 16/927,741 filed on Jul. 13, 2020, which is now a U.S. Pat. No. 11,295,176 issued on Apr. 5, 2022, (ALX-004-US-CON1). ALX-004-US-CON1 is a continuation of U.S. patent application Ser. No. 16/025,776 filed on Jul. 2, 2018, which is now a U.S. Pat. No. 10,713,537 issued on Jul. 14, 2020, (ALX-004-US). ALX-004-US claims benefit from U.S. provisional patent application Ser. No. 62/528,054 filed on Jul. 1, 2017 (ALX-004-US-prov).

The entire contents of above noted patents and applications are incorporated herein by reference.

FIELD OF THE INVENTION

The present invention relates to a system and method for an auto-exposure selection and control employing a neural network, and in particular for determining the auto-exposure for high-dynamic range object detection.

BACKGROUND OF THE INVENTION

Computer vision systems have to measure and analyze a wide range of luminances, from no ambient illumination at night to a bright sunny day, which may exceed 280 dB expressed as a ratio of the highest to the lowest luminance values.

While a typical range of luminance for an ordinary outdoor scene is about 120 dB, there are numerous situations when this range may be much wider. For example, exiting a tunnel may include various scene regions with almost no ambient illumination, the Sun, and scene points with intermediate luminances, all in one image. Capturing this wide dynamic range of luminances has been an open challenge for image sensors, with today's conventional CMOS image sensors being capable of acquiring only about 60-70 dB in a single capture.

This constraint of existing image sensors poses a fundamental problem for low-level and high-level vision tasks in uncontrolled scenarios, and for various industrial applications that make decisions relying on computer vision modules in-the-wild, including outdoor robotics, drones, self-driving vehicles, driver assistance systems, navigation, and remote sensing, to name a few.

To overcome this limitation, prior art vision pipelines rely on high dynamic range (HDR) sensors that acquire multiple captures with different exposures of the same scene. Numerous prior art explores different HDR sensor designs and acquisition strategies, with sequential capture methods and sensors that split each pixel into two sub-pixels being the most successfully deployed HDR sensor architectures.

Although modern HDR image sensors are capable of capturing up to 140 dB at moderate resolutions, e.g., OnSemi™ AR0820AT image sensor, a multi-capture acquisition approach comes with fundamental limitations. Because exposures have different duration or start at different times, capturing a dynamic scene results in motion artefacts, which need to be eliminated. Also custom sensor architectures come at the cost of reduced fill-factor, and hence resolution, and also higher production cost, compared to conventional intensity sensors. Moreover, capturing HDR images not only requires a sensor that can measure the scene but also necessitates a high quality optics for HDR acquisition, without glare and lens flare.

High Dynamic Range Imaging. As existing sensors are not capable of capturing an entire dynamic range of luminance values in real-world scenes in a single shot, HDR imaging methods employ multiplexing strategies to recover this dynamic range from multiple measurements with different exposures. For static scenes, conventional HDR acquisition methods rely on temporal multiplexing by sequentially capturing low dynamic range (LDR) images, also to be referred to as standard dynamic range (SDR) images in this application, for different exposures and then combining them by exposure bracketing. These methods suffer from motion artefacts for dynamic scenes, with a large volume of prior art being focused on post-capture stitching, optical flow, and deep learning. While these methods are successful for photography, they are not suitable for real-time applications, for example robotics. For safety-critical applications, including autonomous driving, recent prior art work that hallucinates HDR content from LDR images is also not an alternative for detection and navigation stacks that must measure a real world.

Adaptive Camera Control. Although an auto-exposure control, or exposure control, is fundamental to acquisition of images using conventional low dynamic range sensors, especially when employed in dynamic outdoor environments, existing exposure control software (and auto-white balance control) has been largely limited to proprietary algorithms. This is because the feedback of exposure control algorithms must exceed real-time capture rates, and as a result, exposure control algorithms are often implemented in hardware on the sensor or as part of the hardware image signal processing (ISP) pipeline. Existing classical algorithms pose optimal exposure selection as an optimal control problem on image statistics, or rely on efficient heuristics. Another prior art approach solves a model-predictive control problem to predict optimal exposure values. Recently, a number of prior art has suggested to select exposure values to optimize local image gradients. Nevertheless, determining the auto-exposure for various computer vision tasks still remains a challenge.

Post-Capture Tonemapping. Numerous prior art has explored tonal adjustments to high-dynamic range or low-dynamic range images after the capture process, driven by scene semantics. Recent tone-mapping approaches rely on deep convolutional neural networks to perform tonal and exposure-adjustments post-capture. While these approaches are capable of compressing the dynamic range after capture, they cannot recover details that are lost during the capture process, including saturated and low-light flux-limited regions.

An example of the prior art arrangement 101, using HDR imaging in a computer vision pipeline, is shown in FIG. 1. A range of luminances in the real world scene is captured at step 102, the range of luminances not being a raw image yet. This range of luminances may span a dynamic range as high as 240 dB, or "40 stops", where one stop up corresponds to a doubling of the amount of light, i.e., 6 dB. In FIG. 1, the range of luminances is shown to be captured at 40 stops (240 dB) for a variety of light exposures, ranging from starlight ($10^{-6}$ cd/m$^2$) to direct sunlight ($10^9$ cd/m$^2$). The light 101, which is not yet an image, is then passed through an optics sensor or lens 103, followed by being collected by an HDR image sensor 105. At the image sensor 105, a raw HDR image 107 is digitized and recorded. There are several types of pixels on the HDR image sensor 105, namely some pixels would record high amount of light, other pixels intermediate amount of light and yet other pixels low amount of lights; or several images are recorded by the same pixels but with different exposure times, or a combination of both. As a result, the HDR image sensor 105 first records a set of low dynamic range (LDR) images (not shown in FIG. 1), each capturing a subset of the entire dynamic range, which is typically about 120 dB. At this step, a fusion of the different LDR images into a single HDR image typically takes place on the sensor, in addition to the recording of the these LDR Images. However, this is optional, and an image signal processor (ISP) 109 could perform this step instead. For example, the HDR image 107 may be produced at 20 stops (120 dB), after which the ISP 109 transforms the HDR image 107 into a LDR image 111 at 7 stops (42 dB), after which an object detection 113 is performed to achieve final detection results 115, for example providing respective coordinates and classes for objects to be identified. One way of visualizing results is to show overlaid boxes containing objects of interest.

Therefore there is a need in industry for developing a computer vision system with improved characteristics, which would overcome or mitigate deficiencies of the prior art.

SUMMARY OF THE INVENTION

There is an object of the present invention to provide a method and system for an improved exposure and/or auto-exposure control and selection for high-dynamic range object detection.

The present invention proposes a neural auto-exposure network that predicts exposure values optimal for a downstream object detection task. This control network and the downstream detector have been trained in an end-to-end fashion jointly with a differentiable image processing pipeline, which transfers the RAW sensor measurements to red, green blue (RGB) images ingested by the object detector model. The training of this end-to-end model is challenging as an auto-exposure (AE) control dynamically modifies the RAW sensor measurement. Instead of an online training approach which would require camera and annotation in-the-loop, the proposed system is trained by simulating the image formation model of a low-dynamic range sensor from input HDR captures. To this end, a novel HDR image dataset is acquired, for example, for automotive object detection. The proposed method is validated by computer simulation and using an experimental vehicle prototype that evaluates detection scores for fully independent camera systems with different auto-exposure control (AEC) methods placed side-by-side and separately annotating ground truth labels. The proposed method outperforms conventional auto-exposure methods by 5.7 mAP across diverse automotive scenarios.

In particular the embodiments of the present invention:
Introduces a synthetic image formation model in the training mode, where LDR images are derived/simulated from captured HDR images;
Proposes a training procedure for the proposed auto-exposure network that relies on the synthetic LDR image formation model;
Introduces a neural network architecture, which predicts exposure values driven by an object detection downstream network in real time and based on the results of the training procedure;
Validates the proposed method by computer simulation and by an experimental prototype, and demonstrates that the proposed neural autoexposure control method outperforms prior art autoexposure methods for automotive object detection across all tested scenarios.

According to one aspect of the invention, there is provided a method for determining an auto-exposure value of a low dynamic range (LDR) sensor for use in high dynamic range (HDR) object detection, the method comprising:
employing at least one hardware processor for:
forming an auto-exposure neural network for predicting exposure values for the LDR sensor driven by a downstream object detection neural network in real time;
training the auto-exposure neural network jointly, end-to-end together with the object detection neural network and an image signal processing (ISP) pipeline, thereby yielding a trained auto-exposure neural network; and
using the trained auto-exposure neural network to generate an optimal exposure value for the LDR sensor and the downstream object detection neural network for the HDR object detection.

In the method described above, the forming comprises forming a Global Image Feature neural network, or a Semantic Feature neural network, or a Hybrid neural network, comprising both the Global Image Feature neural network and the Semantic Feature neural network.

The method further comprises, prior to the training, forming a training dataset of images, comprising:
capturing a set of HDR images by a HDR sensor in real life environment;
for each HDR image from the set of HDR images, forming a corresponding linear HDR image;
thereby forming the training dataset.

Alternatively, the method may comprise, prior to the training, forming a training dataset of images as follows: by a HDR sensor, for each HDR image captured in real life environment, outputting "n" linear LDR images with different exposures selected so that a combined dynamic range of the "n" linear LDR images covers a dynamic range of said each HDR image.

In the method described above, the forming the training dataset further comprises fusing the "n" linear LDR images into a corresponding linear HDR image $I_{hdr}$, the fusing further comprising taking into account weighted average of pixel values across "n" LDR images with weight equal to the inverse of the noise variance.

In the method described above, the training further comprises simulating a simulated raw LDR image from the linear HDR image, and using the simulated raw LDR image for the training of the auto-exposure neural network.

In the method described above, per each training operation, the training comprises simulating a first and second simulated raw LDR images derived from respective first and second linear HDR images and corresponding to two consecutive or closely following frames;
training the first simulated raw LDR image with a random exposure shift; and
training the second simulated LDR image with an exposure value predicted by the auto-exposure neural network based on the training of the first simulated raw image.

In the method described above, the simulating further comprises scaling and quantization of the linear HDR image, followed by optionally clamping the linear HDR image.

In the method described above, the simulating further comprises simulating a radiant power per pixel $\phi_{sim}$ for the simulated raw LDR image as a Bayer pattern sampling of the linear HDR image $I_{hdr}$.

In the method described above, the simulating further comprises adding noise to the simulated raw LDR image to mimic a noise distribution of the LDR sensor.

In the method described above, the forming the global image feature neural network comprises generating histograms from a raw LDR image captured by the LDR sensor at a number of different scales, including a coarse histogram for an entire raw LDR image, and respective finer histograms for corresponding smaller sections of the raw LDR image.

In the method described above, the generating histograms comprises generating histograms from one of the following:
  green pixels values of the raw LDR image;
  luminance pixel values of the raw LDR image;
  red pixels values of the raw LDR image;
  blue pixels values of the raw LDR image.

The method described above further comprises performing one-dimensional convolution operations of the histograms, followed by dense layer operations on the results of convolution operations.

In the method described above, the forming the semantic feature neural network further comprises: using an output from a feature extractor ResNet from the object detection neural network as an input to the semantic feature neural network, followed by channel compression to produce a compressed feature map (CFM);
  performing pyramid pooling of the CFM at different scales; and
  concatenating and densely connecting the results of the pooling.

In the method described above, the training is performed as follows:
  training the semantic feature neural network alone;
  next, adding the global image feature neural network; and
  repeating training of both the global feature and the semantic neural networks together, following the same training procedure;
  Alternatively, the training may be performed by training both the global image feature neural network and the semantic feature neural network jointly together.

In the method described above, the using the trained auto-exposure neural network further comprises one or more of the following:
  predicting the optimal exposure value for the next frame;
  aggregating predicted exposure values across a number consecutive frames.

According to another aspect of the invention, there is provided a system for determining an auto-exposure value of a low dynamic range (LDR) sensor for use in high dynamic range (HDR) object detection, the system comprising:
  a processor, and a memory having computer executable instructions stored thereon for execution by the processor, causing the processor to:
    form an auto-exposure neural network for predicting exposure values for the LDR sensor driven by a downstream object detection neural network in real time;
    train the auto-exposure neural network jointly, end-to-end together with the object detection neural network and an image signal processing (ISP) pipeline, thereby yielding a trained auto-exposure neural network; and
    use the trained auto-exposure neural network to generate an optimal exposure value for the LDR sensor and the downstream object detection neural network for the HDR object detection.

In the system described above, the auto-exposure neural network comprises one of the following:
  a Global Image Feature neural network using histograms derived from a raw LDR image captured by the LDR sensor;
  a Semantic Feature neural network based on image features extracted from the object detection neural network;
  a Hybrid neural network, comprising both the Global Image Feature neural network and the Semantic Feature neural network.

In the system described above, for the hybrid neural network, the computer executable instructions further cause the processor to train the hybrid network in one of the following modes:
  a first mode:
    to train the semantic feature neural network alone;
    next, add the global image feature neural network; and
    repeat training of both the global feature and the semantic neural networks together, following the same training procedure;
  or
  a second mode:
    to train both the global image feature neural network and the semantic feature neural network jointly together.

According to yet another aspect of the invention, there is provided a computer vision system comprising:
  a low dynamic range sensor (LDR) for use in high dynamic range (HDR) object detection; an image signal processor (ISP) for processing a raw LDR image from the LDR sensor and outputting a processed image; and an object detection neural network for further processing the processed image from the ISP;
  the computer vision system further comprising an apparatus for determining an auto-exposure value of the LDR sensor, the apparatus comprising:
  a processor, and a memory having computer executable instructions stored thereon for execution by the processor, causing the processor to:
    form an auto-exposure neural network for predicting exposure values for the LDR sensor driven by the object detection neural network in real time;
    train the auto-exposure neural network jointly, end-to-end together with the object detection neural network and the ISP, thereby yielding a trained auto-exposure neural network; and
    use the trained auto-exposure neural network to generate an optimal exposure value for the LDR sensor.

In the computer vision system described above, the auto-exposure neural network comprises a hybrid neural network, comprising a Global Image Feature neural network and the Semantic Feature neural network.

Thus, an improved method and system for auto-exposure control and selection for high-dynamic range object detection have been provided. A corresponding computer vision system is also disclosed.

DETAILED DESCRIPTION OF THE DRAWINGS

The application contains at least one drawing executed in color. Copies of this patent or patent application publication with color drawing(s) will be provided by the Office upon request and payment of the necessary fee. For a better understanding of the embodiments and/or related implementations described herein and to show more clearly how they may be carried into effect, reference will now be made, by way of example only, to the accompanying drawings which show at least one exemplary embodiment and/or related implementation in which:

FIG. 3A-1 illustrates an operation stage of a system for end-to-end live object detection of one embodiment of the present invention including a global image feature branch;

FIG. 3A-2 illustrates the operation stage of another system of the end-to-end live object detection of another embodiment of the present invention including a semantic feature branch;

FIG. 3A-3 illustrates the operation stage of yet another system of the end-to-end live object detection of yet another embodiment of the present invention having a hybrid architecture including both the global image feature branch of FIG. 3A-1 and the semantic feature branch of FIG. 3A-2;

FIG. 3B-1 illustrates a method of operation of the system of FIG. 3A-1;

FIG. 3B-2 illustrates another method of operation of the another system of FIG. 3A-2;

FIG. 3B-3 illustrates yet another method of operation of the yet another system of FIG. 3A-3;

FIG. 4A-1 illustrates a training stage of the system of FIG. 3A-1;

FIG. 4A-2 illustrates the training stage of the another system of FIG. 3A-2;

FIG. 4A-3 illustrates the training stage of yet another system of FIG. 3A-3;

FIG. 4B-1 illustrates a high-level operational flow-chart corresponding to the end-to-end training methodology of the present invention;

FIG. 4B-2 illustrates another high-level operational flow-chart corresponding to the end-to-end training methodology of the present invention, it corresponds to the details of box 1108 of FIG. 4B-1;

Figure 1:
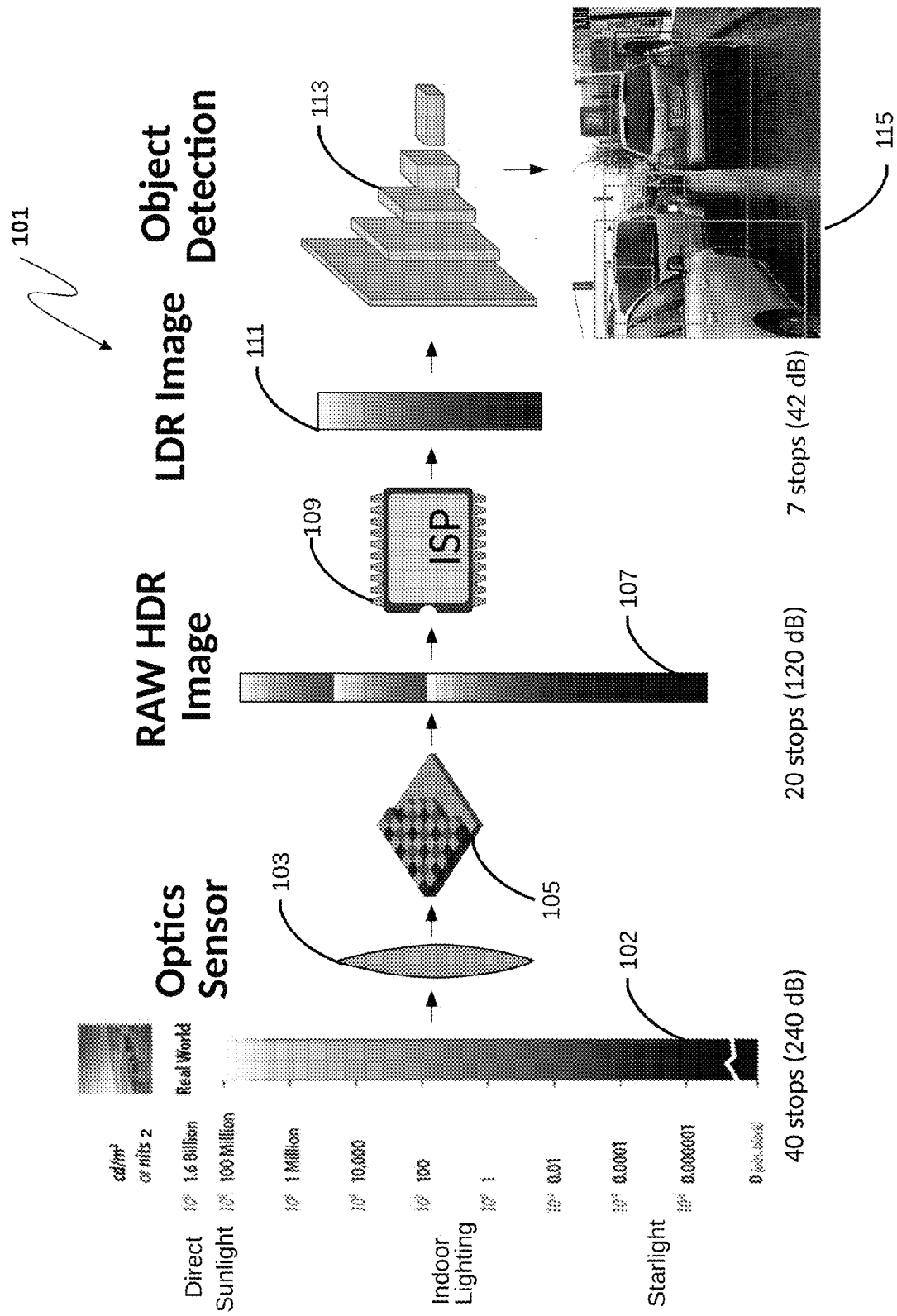
FIG. 1 is a schematic diagram illustrating a prior art method of using HDR imaging in a computer vision pipeline.
Figure 2:
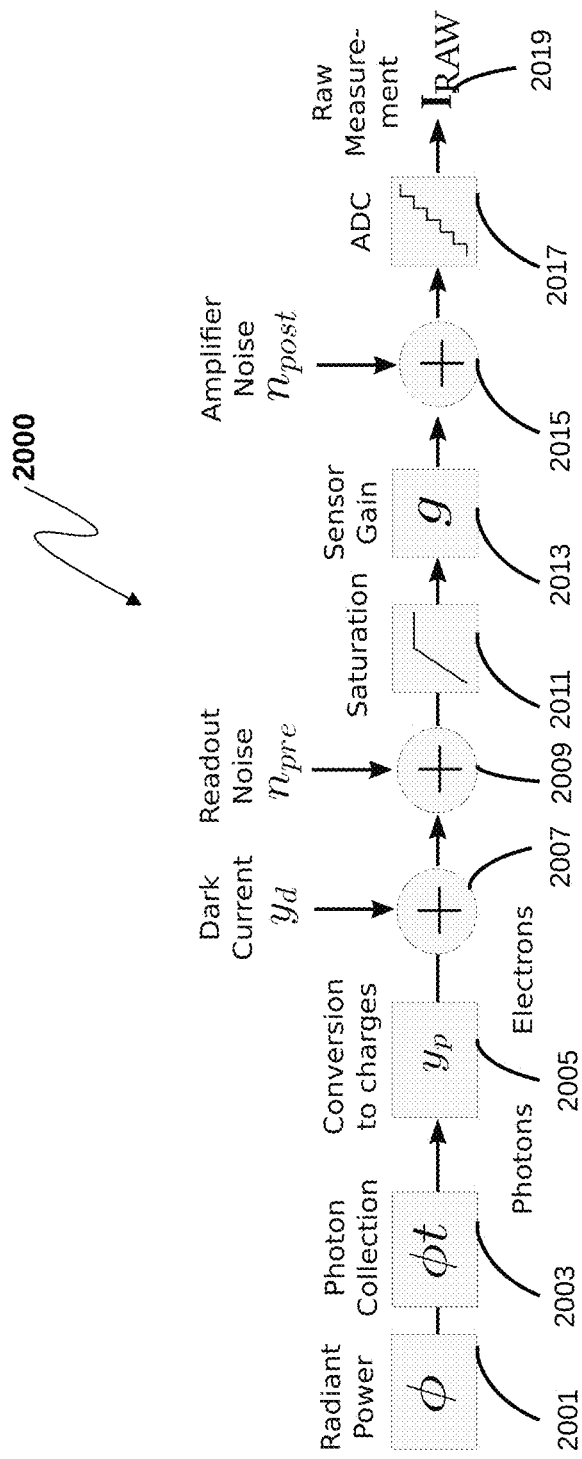
FIG. 2 is a schematic diagram illustrating a sequence of linear and nonlinear operations a physical process of the prior art.
Figures 1, 3A:
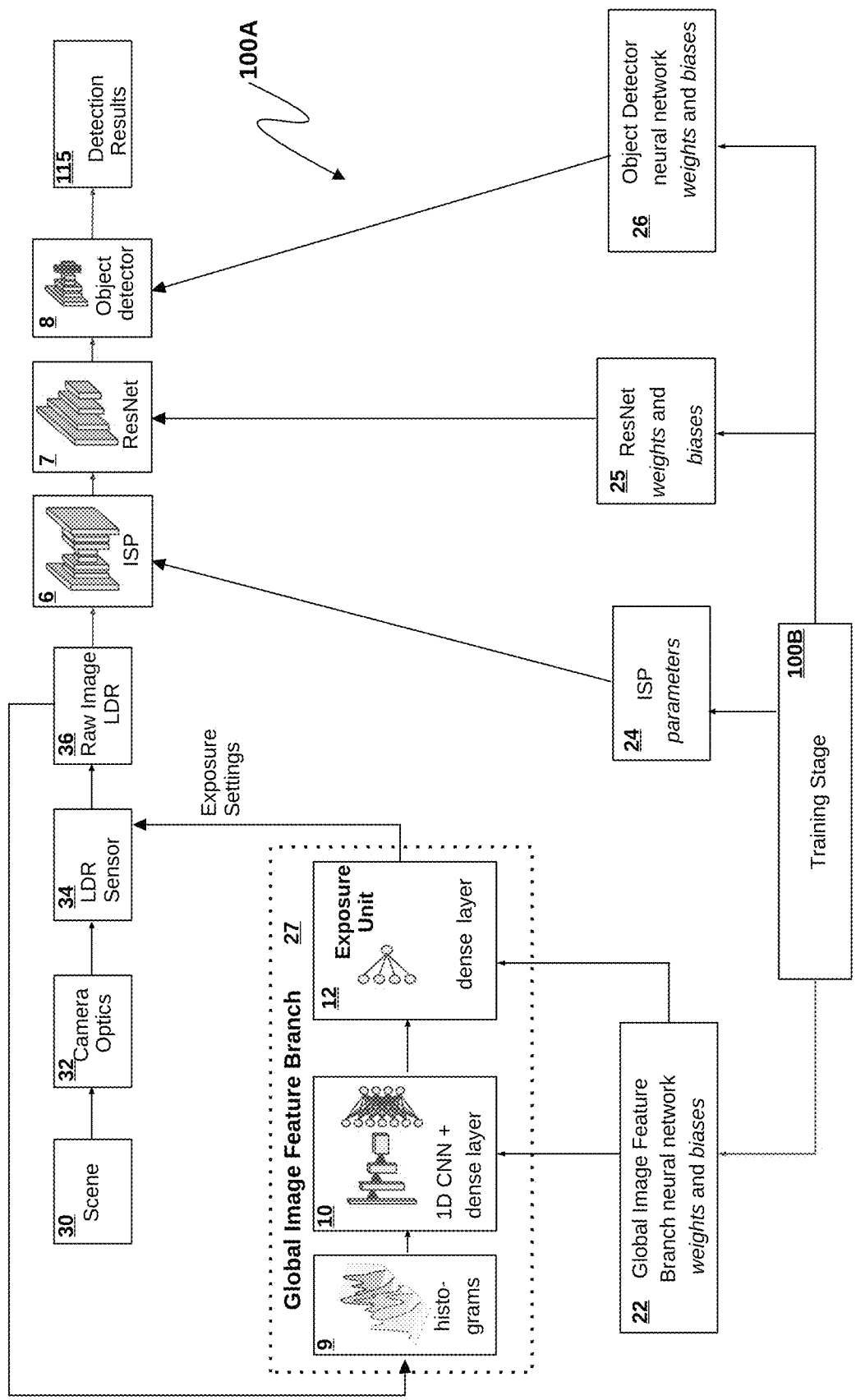
Figures 2, 3A:
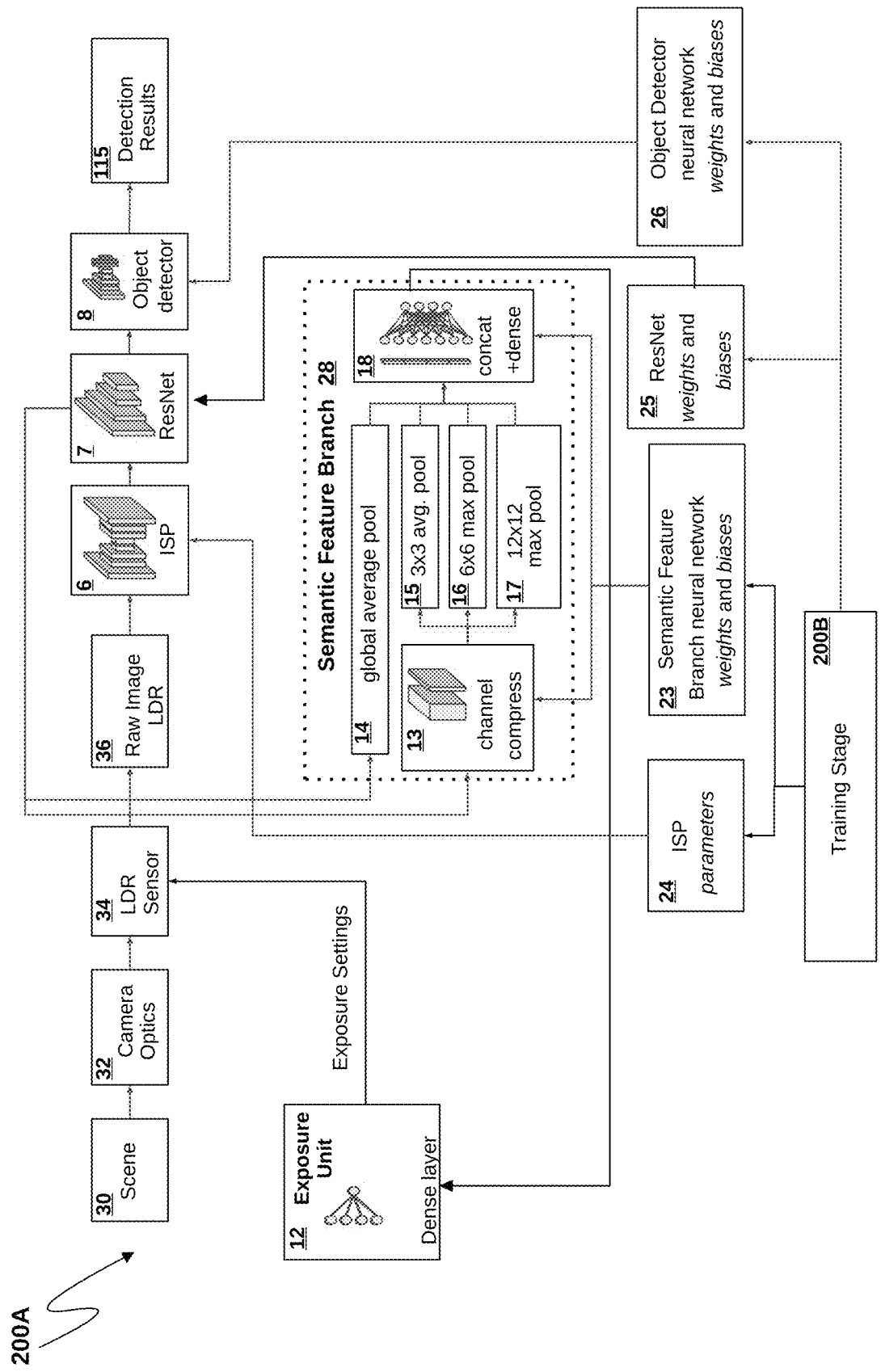
Figures 3, 3A:
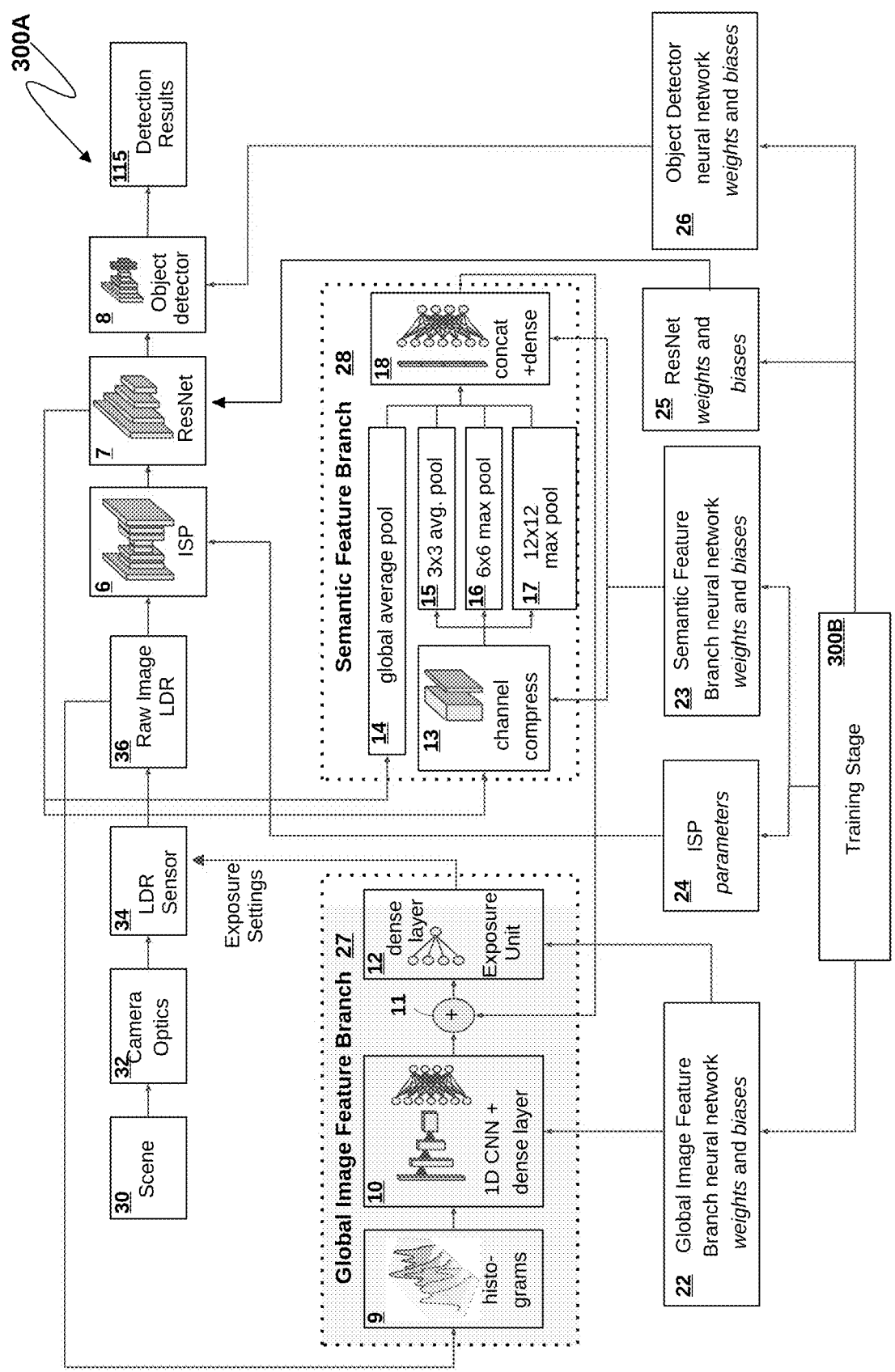
Figures 1, 3B:
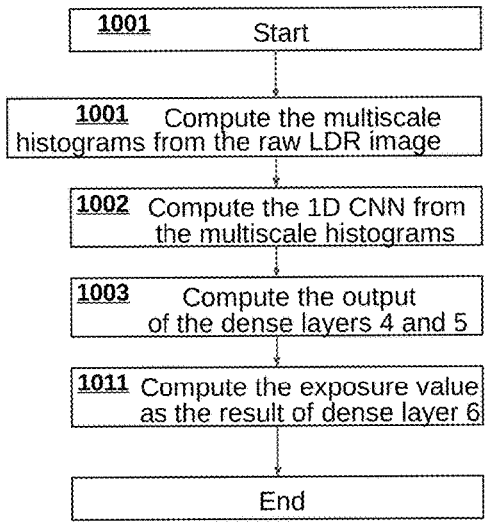
Figures 2, 3B:
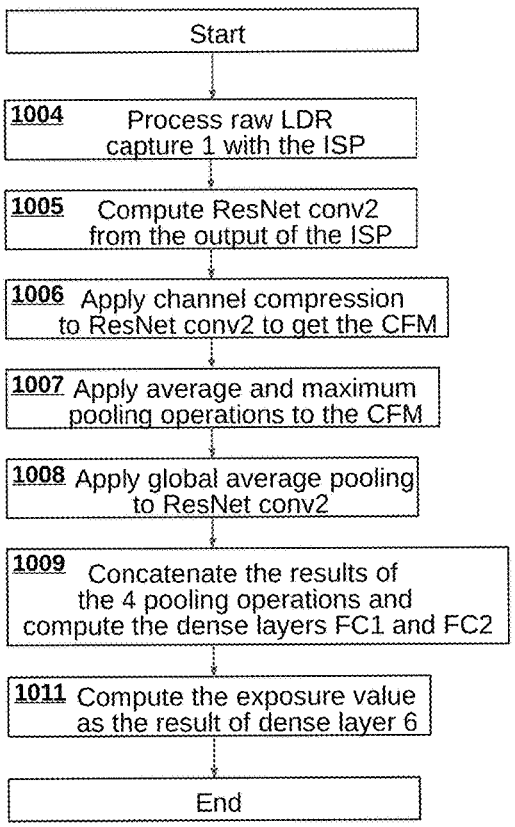
Figures 3, 3B:
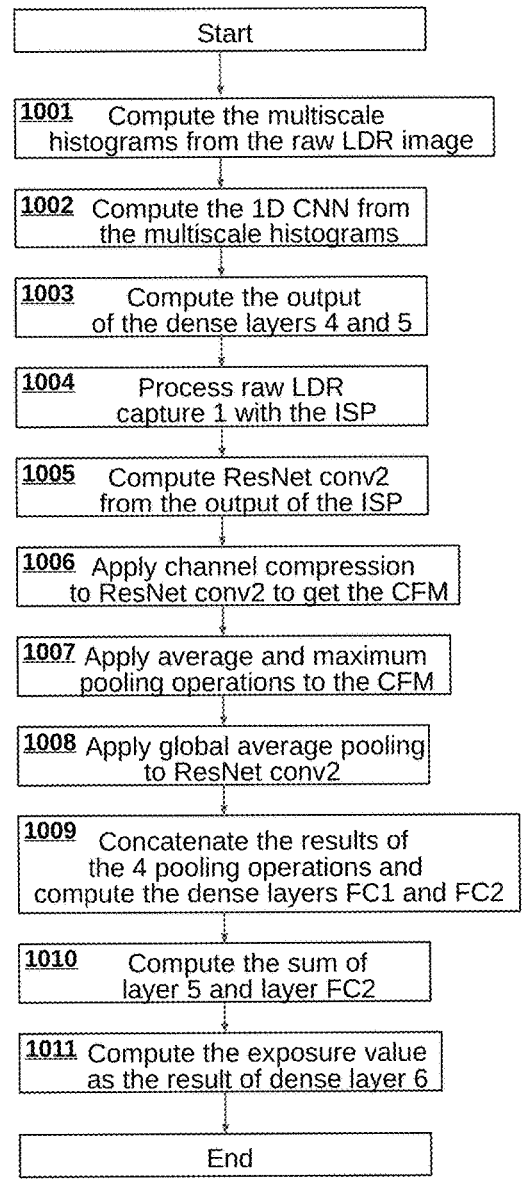
Figures 9A, 9B:
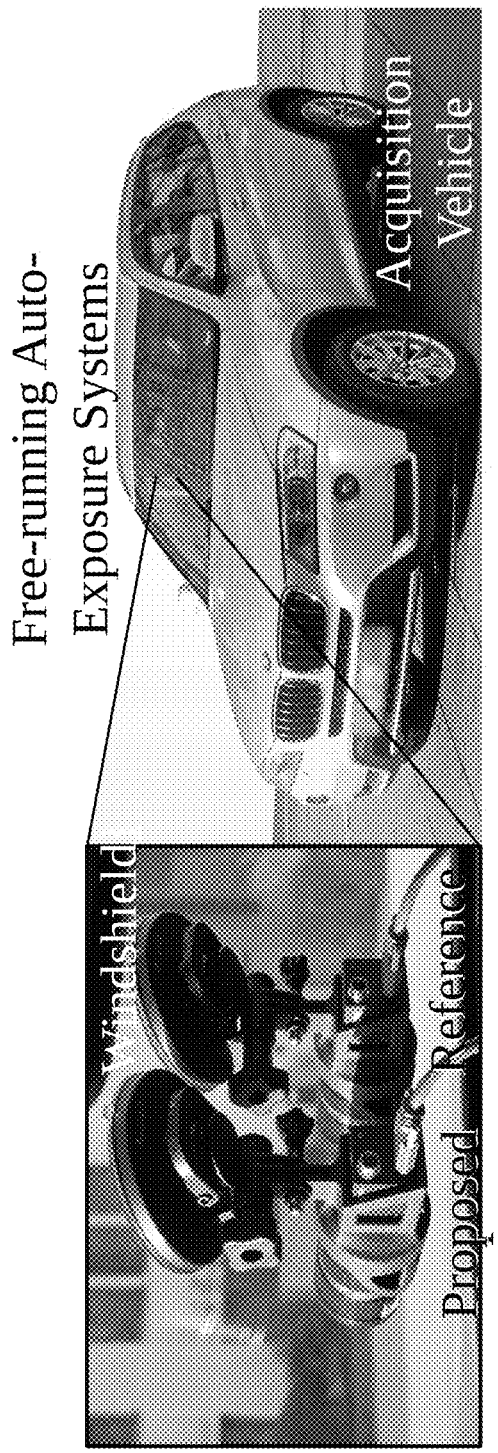

FIGS. 5A1, 5A2, 5A3, 5A4 and 5A5 show results for the prior art method of Average Auto-Exposure calculation for exposure shifts k=1.5, k=4, k=1.5, k=1.5 and k=4 respectively;

FIGS. 5B1, 5B2, 5B3, 5B4 and 5B5 illustrate results for the prior art method of Gradient Auto-Exposure calculation for exposure shifts k=1.5, k=4, k=1.5, k=1.5 and k=4 respectively;

FIGS. 5C1, 5C2, 5C3, 5C4, and 5C5 illustrate results for the histogram method of the FIG. 3A-1 of the present invention for exposure shifts k=1.5, k=4, k=1.5, k=1.5 and k=4 respectively;

FIGS. 5D1, 5D2, 5D3, 5D4 and 5D5 illustrate results for the hybrid method of the FIG. 3A-3 of the present invention for exposure shifts k=1.5, k=4, k=1.5, k=1.5 and k=4 respectively;

FIGS. 6A1, 6A2, 6A3, 6A4, 6A5, 6A6 and FIGS. 6B1, 6B2, 6B3, 6B4, 6B5, 6B6 illustrate experimental prototype results obtained according to a prior art method and according to the method of the present invention respectively;

FIGS. 7A1, 7A2, 7A3, 7A4 and FIGS. 7B1, 7B2, 7B3 and 7B4 illustrate experimental prototype results obtained according to the Average AE baseline method of the prior art and according to the hybrid method of the present invention respectively;

FIGS. 7C1, 7C2, 7C3, 7C4 and FIGS. 7D1, 7D2, 7D3 and 7D4 illustrate experimental prototype results obtained according to the Average AE baseline method of the prior art and according to the hybrid method of the present invention respectively;

FIGS. 7E1, 7E2, 7E3, 7E4 and FIGS. 7F1, 7F2, 7F3 and 7F4 illustrate experimental prototype results obtained according to the Average AE baseline method of the prior art and according to the hybrid method of the present invention respectively;

FIGS. 7G1, 7G2, 7G3, 7G4 and FIGS. 7H1, 7H2, 7H3 and 7H4 illustrate experimental prototype results obtained according to the Average AE baseline method of the prior art and according to the hybrid method of the present invention respectively;

FIGS. 8A1, 8A2, 8A3 and 8A4 illustrate experimental prototype results of the Average AE baseline prior art method for a set of images/scenes, and FIGS. 8B1, 8B2, 8B3 and 8B4 illustrate experimental prototype results of the neural AEC of the hybrid method of FIG. 3A-3 for the set of images/scenes;

FIGS. 8C1, 8C2, 8C3 and 8C4 illustrate experimental prototype results of the Average AE baseline prior art method for another set of images/scenes, and FIGS. 8D1, 8D2, 8D3 and 8D4 illustrate experimental prototype results of the neural AEC of hybrid of FIG. 3A-3 for the another set of images/scenes;

FIG. 9A illustrates an experimental capture setup for performing a side-by-side comparison of the hybrid method of FIGS. 3A-3 and 3B-3 and a prior art method based on average auto-exposure, for installation in an acquisition vehicle;

FIG. 9B illustrates the acquisition vehicle with the experimental capture setup of FIG. 9A; and FIGS. 10A, 10B, 10C and 10D illustrates the experimental capture setup of FIGS. 9A and 9B in more detail.

DETAILED DESCRIPTION OF THE EMBODIMENTS

In the present invention, low dynamic range (LDR) sensors have been used, and paired with learned exposure control, as a computational alternative to HDR sensors of the prior art.

The methods of the present invention are performed by employing a hardware processor. The systems described in the embodiments comprise executable instructions stored in a memory device for execution by a processor, as described in greater detail below.

1. Image Formation Model 1.1 Single-Shot Image Formation

Real-world scenes are inherently HDR. Direct sunlight has a luminance around $1.6 \cdot 10^9$ cd/m$^2$, while starlight lies around $10^{-4}$ cd/m$^2$. Accordingly, the total range of luminances the human eye is exposed to ranges from $10^{-6}$ cd/m$^2$ to $10^8$ cd/m$^2$ which is a range of 280 dB. However, the range of differences discernible by the eye is lower, at 60 dB in very bright conditions (contrast ratio of 1000) and 120 dB in dimmer conditions (contrast ratio of $10^6$). The dynamic range of a camera employing a 12-bit sensor is bounded from above by 84 dB because of the quantized sensing, and we note that the effective dynamic range is even lower because of optical and sensor noises (around 60-70 dB). Examples of optical noise are veiling glare, stray light and aperture ghosts. The sensor noise tends to dominate the optical noise for LDR cameras while the converse is true for HDR cameras. The dynamic range is progressively shrunk throughout the image processing pipeline, as shown for example in FIG. 1. It follows that choosing where this dynamic range lies in the scale of possible luminances is critical to capture the useful information for the task at hand. This is the role of the AEC.

The image formation model considered in this work is illustrated in FIG. 2. We consider the recording of a digital value by the sensor at a pixel as the result of the following single-shot capture process. Radiant power $\phi$ exposes the photosite during the exposure time t, creating $y_p(\phi \cdot t)$ photoelectrons. We express $\phi$ in electrons (e−) and t in seconds (s). Dark current creates $y_d(\mu_d)$ electrons, where $\mu_d$ is the average number of electrons in the absence of light. This measurement results in y e electrons accumulated, that is $$y_e = \max(y_p(\phi \cdot t) + y_d(\mu_d), M_{well}), \quad (1)$$

where $M_{well}$ is the full well capacity expressed in electron. Those $y_e$ electrons are converted to a voltage which is amplified before being converted to a digital number that is recorded by the sensor as a pixel value. The voltage is affected by noise before amplification (readout noise) and after amplification (analog-to-digital conversion noise). This process results in the following model for raw pixel measurement. A value recorded by the sensor is expressed in digital numbers (DN), a dimensionless unit.

$$I_{sensor} = q(g \cdot (y_e + n_{pre}) + n_{post}), \quad (2)$$

where $n_{pre}$ is the thermal and quantum noise introduced before amplification, and $n_{post}$ is the readout noise introduced after and during amplification. Both $n_{pre}$ and $n_{post}$ are expressed in DN. The constant g is the camera gain, it is expressed in digital number per electron (DN/e−). It can be broken down into $g = K \cdot g_1$, where $g_1$ is the gain at ISO 100 and K is the camera setting of the gain, i.e. K=1 for ISO 100, K=2 for ISO 200, etc. The function q corresponds with the quantization performed by the analog-to-digital conversion, $$q(x) = \min(\lfloor x + 0.5 \rfloor, M_{white}) \quad (3)$$

The constant $M_{white}$ is the white level, i.e. the maximum value that can be recorded by the sensor. Here we assume that the image of the targeted camera is recorded as a 12 bit raw image so we use $M_{white} = 2^{12} - 1$. For the purpose of training with stochastic gradient descent we override the gradient of the floor function as the function uniformly equal to 1, i.e. the gradient is computed as if floor was replaced by the identity function. In the model presented above, the quantization is modeled explicitly with function q as compared to the prior art, where the quantization is modeled as a quantization noise, which they include in the post amplification noise $n_{post}$. However, the quantization error is still expressed as a variance when considering the signal-to-noise ratio (SNR).

FIG. 2 illustrates a physical process 2000 where the radiant power is collected at step 2001, and passed onto a photon collection step 2003, after which the photons experience conversion to charges at step 2005, and the resulting electrons are tainted with additional noise electrons due to dark current at step 2007. The following steps include noise readout 2009, saturation 2011, sensor gain 2013, and amplifier noise sensing 2015. The step 2015 is the addition of the amplifier noise to the output of the sensor gain. In practice, it is impossible to separate the addition of amplifier noise from the sensor gain operation, however, it is a mathematical convenience to represent the combination of amplifier noise to sensor gain, which helps to understand at which point in the process the amplifier noise appears. The next step is the Analog-to-Digital Conversion (ADC) 2017, which entails quantization and clipping of the value between 0 and the maximum encodable value $M_{white}$. The result is yielding a raw measurement at step 2019. In other words, the radiant power 2001 at a photosite goes through a sequence of linear and nonlinear operations to result in a digital value which is the sensor's output. Each of these steps add noise and affects the overall image quality.

1.2 Noise Model

The number of photoelectrons $y_p(\phi \cdot t)$ and dark currents electrons $y_d(\mu_d)$ is modeled for a given pixel with Poisson distributions.

$$y_p(\phi \cdot t) \sim P(\phi \cdot t), \, y_d(\mu_d) \sim P(\mu_d)$$

The average number of electrons in the absence of light $\mu_d$ grows linearly with the exposure time $$\mu_d = \mu_0 + \mu_1 \cdot t$$

The effect of temperature on $\mu_d$ is ignored.

Due to the properties of the Poisson distribution the variance equals the mean value, i.e. the standard deviations are as follows.

$$\sigma(y_p(\phi \cdot t)) = \sqrt{\phi \cdot t}, \, \sigma(y_d(\mu_d)) = \sqrt{\mu_0 + \mu_1 \cdot t}$$

The pre- and post-amplification noises, are modeled as zero-mean gaussian variables.

$$n_{pre} \sim N(0, \sigma_{pre}^2), \, n_{post} \sim N(0, \sigma_{post}^2).$$

Note that constants $\mu_d$, $\sigma_{pre}$ and $\sigma_{post}$ need to be calibrated.

The above sensor noise and the quantization noise of the ADC 2017 affect the overall signal-to-noise ratio (SNR) and the dynamic range (DR) of the captured image.

1.3 SNR and Dynamic Range

Noise Variance. The total variance of the noise for unsaturated pixels of a single exposure can be derived from the model above. The unsaturated pixel value can be written as $$I_{unsat} = g \cdot (y_p(\phi \cdot t) + y_d(\mu_d) + n_{pre}) + n_{post}$$

and its variance $$V_{unsat} = g^2 \cdot \left((\phi + \mu_I) \cdot t + \mu_0 + \sigma_{pre}^2\right) + \sigma_{post}^2 + \sigma_q^2.$$

The square error $\sigma_q^2$ accounts here for the quantization error. We take it as the variance of the uniform probability distribution on [0, 1], i.e. $\sigma_q^2 = 1/12$.

Signal-to-Noise Ratio.

The squared signal-to-noise ratio (SNR) for a pixel receiving the radiant power % phi can be derived as follows.

$$SNR(\phi)^2 = \frac{\phi^2 \cdot t^2 \cdot \delta_{I_{sensor} < M_{white}}}{(\phi + \mu_I) \cdot t + \mu_0 + \sigma_{pre}^2 + (\sigma_{post}^2 + \sigma_q^2)/g^2}$$

The term $\delta_{I_{sensor} < M_{white}}$ which is equal to 1 whenever the pixel value is below the maximum possible value and 0 otherwise, expresses the fact that the information is lost when a pixel is saturated at maximum value. For most sensors, the following is true for all ISO settings $$M_{white} < g \cdot M_{well},$$

making $M_{white}$ the deciding quantity for saturation. It could be argued that this loss of information may happen at lower values too, because of saturation at M well followed by a negative noise $n_{post}$. We ignore this possibility here.

Dynamic Range. The dynamic range DR expressed in dB, is limited by the saturation at the higher end and by noise at the lower end. Here we consider the image sensor noise and ignore the optical noise which is acceptable for an LDR single-shot camera. Let $\phi_{sat}$ be the irradiance such that, on average, the pixel value just reaches $M_{white}$, i.e.

$$g \cdot (\phi_{sat} \cdot t + \mu_0 + \mu_I \cdot t) = M_{white}$$

and let $\phi_{min}$ be the irradiance such that the SNR equals 1. Solving for $\phi$ in the squared SNR expression we get:

$$\phi_{min} = 1 + \sqrt{1 + 4t \cdot v} / (2t)$$

with $$v = \mu_I + \left(\mu_0 + \sigma_{pre}^2 + (\sigma_{post}^2 + \sigma_q^2) \cdot g^{-2}\right)/t.$$

The dynamic range DR expressed in dB is defined as $$DR = 20 \cdot \log_{10}\left(\frac{\phi_{sat}}{\phi_{min}}\right).$$

2. Learning Exposure Control

As a computational alternative to the popular direction of HDR sensors, low dynamic range sensors are revisited, and paired with learned exposure control. In the present invention, single-shot imaging is proposed with a learned adaptive exposure for dynamic scenes, departing from multi-capture methods that are fundamentally limited in dynamic scenes.

FIGS. 3A-1, 3A-2 and 3A-3 illustrate various embodiments of the operation stage of the system for the end-to-end live object detection method with neural auto exposure control.

In particular, FIG. 3A-1 illustrates the operation stage of the system for end-to-end live object detection of one embodiment of the present invention including the global image feature branch. FIG. 3A-2 illustrates the operation stage of another system of the end-to-end live object detection of another embodiment of the present invention including a semantic feature branch, while FIG. 3A-3 illustrates the operation stage of yet another system of the end-to-end live object detection of yet another embodiment of the present invention having a hybrid architecture including both the global image feature branch of FIG. 3A-1 and the semantic feature branch of FIG. 3A-2.

Accordingly, FIG. 3B-1 illustrates a method of operation of the system of FIG. 3A-1; FIG. 3B-2 illustrates another method of operation of the another system of FIG. 3A-2; and FIG. 3B-3 illustrates yet another method of operation of the yet another system, or hybrid system of FIG. 3A-3, showing the production pipeline for the AE model based on both branches.

In the pooling operations in the above figures, n×n does not refer to a receptive field, but means the feature map is divided up into a n by n array.

More specifically, given a captured frame number t, the proposed learned exposure control network predicts the exposure and gain values of the next frame number t+1 from either a global image statistics or scene semantics, or both in two network branches. The global image feature branch operates on a set of histograms computed from the image at three different scales (and in general at M different scales). While this branch efficiently encodes global image features, the semantic feature branch exploits semantic features that are shared with a downstream object detector module. The two branches can either be used independently or jointly. We refer to the joint model as "Hybrid NN", or Hybrid Neural Network.

2.1. Operation Stage—Global Image Feature Branch

As mentioned above, FIG. 3A-1 illustrates the operation stage 100A of the system for end-to-end live object detection of one embodiment of the present invention including the global image feature branch 27.

Camera optics 32 alters a path of light rays from a scene 30 to be captured, such that an image of the scene captured by an LDR sensor 34 is in focus. The capture happens at the LDR sensor 34 producing an LDR raw image 36.

The exposure time is set in the LDR sensor 34, but the computation of the actual exposure value, or exposure setting, is performed outside of the sensor 34, namely the exposure value/setting is computed in the Exposure unit 12 of the Global Image Feature Branch 27, as will be described in detail below.

The raw LDR image is supplied to an Image Signal Processor (ISP) 6. An output from the ISP 6 is a processed image, which is further supplied to a Residual Network ResNet 7 or a neural network 7, followed by Object detection 8 and displaying detection results 115. ResNet 7 neural network is a feature extractor, which acts as a preprocessing step before applying the Object detector 8, which is also a neural network, but it cannot be applied directly to the processed image, it needs the output of the feature extractor ResNet 7.

Operational ISP parameters 24, Resnet weights and biases 25, Object Detector neural network weights and biases 26, and Global Feature Branch neural network weights and biases 22 are supplied from the Training Stage 100B, the Training Stage 100B to be described in detail below with regard to FIGS. 4A-1 and 4B-1.

In the Global Image Feature branch 27, to incorporate global image statistics without the need for a network with a very large receptive field, we rely on histogram statistics as input. We note that histogram statistics can be estimated with efficient ASIC blocks on the sensor or in a co-processor. In one embodiment, we compute the histogram from green pixel values of the raw LDR image, but it is understood that histogram could be also computed from the luminance, or the other pixels as well.

In one embodiment, the input to the global image feature branch 27 is a tensor of shape that represents 59 histograms, each with 256 bins, stacked together (FIG. 3A-1 box 9, FIG. 3B-1 box 1001). These histograms are computed at three different scales (details not shown in FIGS. 3A and 3B).

The coarsest scale is the whole image which yields one histogram.

At the intermediate scale, h1 histograms are computed, for example 9 histograms are computed, following a 3 by 3 division of the image, or by h1×h1 division in general case.

At the finest scale, the image is divided up into h2×h2, for example 7 by 7 sub-images, yielding 49 histograms, or h2×h2 histograms in general case. After computation and stacking of the histograms, the global image feature branch starts with a one-dimensional convolutional neural network (CNN) (FIG. 3A-1 box 10, FIG. 3B-1 box 1002). The first 3 layers are 1D convolutions where the convolution operates along the histograms. The width of the layers increases by doubling every layer, starting at 128. The convolution kernel size and the stride are equal to 4. We also expect that using similar values for the convolution kernel size and stride would also work, for example kernel size in {2, 3, 4, 5, 6, 7, 8} and stride in {1, 2, 3, 4}. Using a larger kernel and a smaller stride may result in more computations. Using a smaller kernel and a larger stride would result in less computations but might also result in less accurate auto-exposure. Usually, an empirical search only can guide us towards better suitable values for these parameters.

Three dense layers follow, with a decreasing number of units, 1024 units for Layer 4, 16 units for Layer 5 and a single unit for Layer 6 which is the last layer (FIG. 3A-1 box 10 and FIG. 3B boxes 1003 for Layers 4 and 5, FIG. 3A-1 box 12 and boxes 1011 for Layer 6).

Although we have experimented with only one scale and three scales in the present application, it is possible that another number of scales would work as well or possibly even better. The idea to use more than one scale is that a single histogram does not provide enough local information. For example when we are about to exit a tunnel, or just before entering a tunnel, the histogram at the center of the image is different from the histogram elsewhere.

Each of the layers 1 to 5 are followed by a Rectified Linear Unit (ReLU) activation function. The last layer is followed by a custom activation function that computes the final exposure adjustment for frame number t as:

$$u_t = \exp(2 \cdot (\text{sigmoid}(x) - 0.5) \cdot \log(M_{\exp})) \quad (4)$$

where x is the preactivation of Layer 6. The constant $M_{exp} > 0$ is the maximum exposure change, it is a bound such that $u_t \in [M_{exp}^{-1}, M_{exp}]$. In this implementation $M_{exp} = 10$ is chosen. Mexp=10 quantifies by how much we challenge the auto-exposure module by presenting ill-exposed images during training. The larger it is, the more over- and under-exposed the simulated LDR images will be. The choice for maximum exposure is empirical, wherein Mexp=10 value is for example set to the largest exposure value for which a stable training can still be performed. In our later experiments we have managed to use even larger Mexp values, which was possible due to using a base exposure differently.

Table 1 below lays out the linear architecture of the global image feature branch 27 and recaps the hyper-parameters of each layer.

TABLE 1

Global Image Feature Branch Architecture

| Layer | Operation | Number of Filters | Kernel Size | Stride | Output Shape |
|---|---|---|---|---|---|
| 0 | Input tensor | — | — | — | [256, 59] |
| 1 | 1D Convolution | 128 | 4 | 4 | [64, 128] |
| 2 | 1D Convolution | 256 | 4 | 4 | [16, 256] |
| 3 | 1D Convolution | 512 | 4 | 4 | [4, 512] |
| 4 | Dense layer | 1024 | — | — | [1024] |
| 5 | Dense layer | 16 | — | — | [16] |
| 6 | Dense layer | 1 | — | — | [1] |

2.2. Operation Stage—Semantic Feature Branch

FIG. 3A-2 illustrates the operation stage 200B of another system of the end-to-end live object detection of another embodiment of the present invention including a semantic feature branch 28.

Similar to that of FIG. 3A-1, camera optics 32 alters a path of light rays from a scene 30 to be captured, such that an image of the scene captured by an LDR sensor 34 is in focus. The capture happens at the LDR sensor 34 producing an LDR raw image 36.

The exposure time is set in the LDR sensor 34, but the computation of the actual exposure value, or exposure setting, is performed outside of the sensor 34, namely the exposure value/setting is computed in the Exposure unit 12 with the input from the box 18 of the Semantic Feature Branch 28, as will be described in detail below.

The raw LDR image is supplied to an Image Signal Processor (ISP) 6. The output from the ISP is a processed image, which is further supplied to a Residual Network ResNet 7 or a neural network 7, for further processing, followed by Object detection 8 and displaying detection results 115.

ISP parameters 24, Semantic Feature Branch neural network weights and biases 23, Resnet weights and biases 25, and Object Detector neural network weights and biases 26 are supplied from the Training Stage 100B, the Training Stage 200B to be described in detail below with regard to FIGS. 4A-2 and 4B-1.

The Semantic Feature branch 28 incorporates semantic feedback into the auto-exposure control unit 12. To this end, we reuse the computation of the feature extractor of the object detector from the current frame. We use the output of ResNet conv2 (FIG. 3A-2 box 7, FIG. 3B-2 box 1005) as the input to the semantic feature branch 28. We first apply channel compression from 64 to 26 channels and refer to the output as the compressed feature map (CFM) (FIG. 3A-2 box 13, FIG. 3B-2 box 1006). Then we apply pyramid pooling at 4 scales (FIG. 3A-2 boxes 14, 15, 16, 17, and FIG. 3B-2 boxes 1007 and 1008). At the coarsest of the four scales we apply average pooling of the output of conv2 along the two spatial dimensions (FIG. 3A-2 box 14, and FIG. 3B-2 box 1008). At the finest scales we use growing size of max and average pooling operations on the CFM (FIG. 3A-2 boxes 15, 16, 17, and FIG. 3B-2 box 1007).

We now provide more details of the architecture of the semantic feature branch 28 of the embodiment of the invention. At the beginning of the semantic feature branch 28, the ResNet conv2 (box 7) feature map is first cropped. The first 120 rows only are kept. The number of rows of 120 has been selected for convenience and being divisible by 40 while 150, the original height of the feature map, is not. This makes it easy to do the operation Avg pool 1 which kernel has height 40. This makes for a convenient shape when pooling at different scales later (this cropping is not shown in FIGS. 3A-2 and 3B-2). It is also noted that no important information is lost in the process given that the bottom of the image is mostly occupied by the hood of the car. After that cropping, the feature map undergoes a channel compression from 64 to 26 by using a 1×1 convolution, producing the compressed feature map (CFM) (FIG. 3A-2 box 13, FIG. 3B-2 box 1006). The channels of the CFM are pooled at 3 different scales (FIG. 3A-2 boxes 15, 16, 17, and FIG. 3B-2 box 1007). The first two channels are max pooled with a stride of 10 along rows and 20 along columns, which amounts to dividing up the feature map along rows and columns into a 12 by 12 array of sub tensors and computing the maximum of each of them channel wise (FIG. 3A-2 box 17, and FIG. 3B-2 box 1007). The next 8 channels of the CFM are max pooled with a stride of 20 along rows and 40 along columns, which amounts to dividing up the feature map into a 6 by 6 array of sub tensors and computing the maximum of each of them channel wise (FIG. 3A-2 box 16, and FIG. 3B-2 box 1007). The last 16 channels of the CFM are average pooled with a stride of 40 along rows and 80 along columns, which amounts to dividing up the feature map into a 3 by 3 array of sub tensors and computing the average of each of them channel wise (FIG. 3A-2 box 15, and FIG. 3B-2 box 1007). A fourth pooling is performed image wide on the cropped (64-channel) feature map, i.e. each of the 64 channels is averaged along the two spatial dimensions (FIG. 3A-2 box 14, and FIG. 3B-2 box 1008). Each of the tensors resulting from those 4 pooling operations are flattened, yielding vectors of lengths 288, 288, 144, and 64 respectively. They are concatenated together to give a 784-long vector (FIG. 3A-2 box 18, and FIG. 3B-2 box 1009). Those 784 units are then densely connected to a 16-unit layer which is the output of the semantic feature branch 28 (FIG. 3A-2 box 18, and FIG. 3B-2 box 1009).

The output from box 18 is supplied to the Exposure Unit 12 for calculating exposure setting, namely: The resulting vector of length 16 is followed by a common final densely connected layer with a custom activation function as described in Section 4.1 (equation (4)) (FIG. 3A-2 box 12, and FIG. 3B-2 box 1011). This final densely connected head uses both branches to make the exposure prediction.

Table 2 below details the directed acyclic graph architecture of the semantic feature branch 28 by specifying the input of each layer, as well as their hyperparameters.

TABLE 2

Semantic Feature Branch Architecture

| Layer | Input | Operation | Number of Filters | Kernel Size | Stride | Output Shape |
|---|---|---|---|---|---|---|
| ResNet conv2 | — | Input tensor | — | — | — | [150, 240, 64] |
| Cropped feature map | ResNet conv2 | Crop rows [0:120] | — | — | — | [120, 240, 64] |
| Compressed feature map (CFM) | Cropped feature map | Convolution | 26 | 1 | 1 | [120, 240, 26] |
| Max pool 1 | CFM channels [0:2] | Max pool | — | 10 × 20 | [10, 20] | [12, 2, 2] |
| Max pool 2 | CFM channels [2:10] | Max pool | — | 20 × 40 | [20, 40] | [6, 6, 8] |
| Avg pool 1 | CFM channels [10:26] | Average pool | — | 40 × 80 | [40, 80] | [3, 3, 16] |
| Avg pool 2 | ResNet conv2 cropped | Average pool | — | — | — | [1, 1, 64] |
| Pool out | Max pool 1 Max pool 2 Avg pool 1 Avg pool 2 | Flatten + concatenate | — | — | — | [748] |
| FC 1 | Pool out | Dense layer | 1024 | — | — | [1024] |
| FC 2 | FC 1 | Dense layer | 16 | — | — | [16] |

2.3 Operation Stage—Hybrid Model

FIG. 3A-3 illustrates the operation stage 300A of yet another system of the end-to-end live object detection of yet another embodiment of the present invention having a hybrid architecture including both the global image feature branch 27 of FIG. 3A-1 and the semantic feature branch 28 of FIG. 3A-2.

Similar items are designated by same reference numerals in FIGS. 3A-1, 3A-2 and 3A-3.

The hybrid system 300A differs from the global image feature system 100A and the semantic feature system 200A in that:

The Global Image Feature Branch neural network weights and biases 22, ISP parameters 24, Semantic Feature Branch neural network weights and biases 23, Resnet weights and biases 25, and Object Detector neural network weights and biases 26 are supplied from the Training Stage 300B, the Training Stage 300B to be described in detail below with regard to FIGS. 4A-3 and 4B-1; and the output from the box 10, Layer 5 of the global image feature branch 27, and the output from the box 18 of the semantic feature branch 28, are summed at a node 11, to jointly provide input to the Exposure calculation unit 12. In more detail, the output of Layer 5 (box 10) of the global image feature branch 28 is summed to the output of the second fully connected layer (FC 2) from box 18 of the semantic feature branch 28, after rescaling. That is, the output of FC 2 is rescaled by a constant factor that we set to 0.01, which value has been so as to make the output of both branches roughly of the same magnitude. This rescaling allows the signal coming from both branches 27 and 28 to be on the same order of magnitude.

Thus, after summation at the node 11, the resulting vector of length 16 is followed by a common final densely connected layer with a custom activation function as described in Section 4.1 (equation (4)) (FIG. 3A-3 box 12, and FIG. 3B-3 box 1011). This final densely connected head uses both branches 27 and 28 to make an exposure prediction, and we refer to it as "Hybrid NN" in the following.

2.4 Exposure Prediction Filtering

To further improve the accuracy of the exposure control at inference time we aggregate exposure predictions across consecutive frames with an exponential moving average of the logarithm of the exposure, $$\log e_t = \mu \cdot \log e_{t-1} + (1-\mu) \cdot \log (e_{t-1} \cdot u_t) \quad (5)$$

i.e. $e_t = e_{t-1} \cdot u_t^{1-\mu}$, where $e_t$ is the next exposure value, $e_{t-1}$ is the exposure at the previous frame, $u_t$ is the exposure t adjustment predicted by the neural networks of Sections 4.1 and 4.2. We set the smoothing hyperparameter to $\mu = 0.9$ in this implementation.

Thus, the exposure prediction filtering comprises a recursive low pass filter. It is only done in operation, and used to make the auto-exposure result more stable.

2.5 Shutter Speed and Gain from Exposure Value

The neural exposure prediction described above produces a single exposure value $e_t = K \cdot t_{exp}$ with K the gain and $t_{exp}$ the exposure time. Since maximizing the exposure time maximizes the SNR, it is $$K = \max(1, e_t / T_{max}), \quad t_{exp} = e_t / K \quad (6)$$

where $T_{max}$ is the maximum allowed exposure time, which we set to $T_{max} = 15$ ms.

2.6 Image Signal Processing (ISP) Pipeline

The raw LDR image 36, acquired by the camera optics 32 and captured by the LDR sensor 34, is processed by a differentiable software signal image processor (ISP) 6. We provide here an example of a differentiable ISP 6 having a linear pipeline comprising the following processing blocks and trainable parameters.

1. Demosaicing. No trainable parameter.
2. Downsampling. No trainable parameter.
3. Denoising with a bilateral filter. Two trainable parameters: the range $\sigma_r$ parameter (same unit as intensity pixel values) and the spatial parameter $\sigma_d$ (pixel unit).
4. Sharpening with an unsharp mask filter. Two trainable parameters: the radius (pixel unit) and the magnitude of the sharpening (unitless positive value).
5. Gamma correction. One trainable parameter: $\gamma$.

The ISP parameters 24 are trained jointly with the other trainable variables including auto exposure, feature extractor and object detector. We note that the proposed method is orthogonal to the ISP employed, i.e. independent from structure of the ISP 6, and indeed supports arbitrary image processing pipelines, as long as those are differentiable. In the FIGS. 3A-1, 3A-2, 3A-3 the ISP is shown in box 6, in the FIGS. 3B-1, 3A-2 and 3A3 the ISP processing is performed in the step 1004.

3. Training

An overview of the training approach is illustrated in the system diagrams 100B, 200B and 330B of FIGS. 4A1, 4A-2 and 4A-3 respectively. The corresponding operational flowchart 400 is shown in FIG. 4B.

Similar modules appear in both the production system diagrams (FIGS. 3A-1, 3A-2 and 3A-3) and the training system diagrams (FIGS. 4A-1, 4A-2 and 4A-3). Such modules are labeled with the same reference numerals in the above mentioned diagrams.

In the following, we describe the training methodology in detail.

In FIGS. 4A-1, 4A-2 and 4A-3, the simulated LDR images, simulated raw image 1 (box 3) and simulated raw image 2 (box 5) are simulated/made from respective captured linear HDR image 1 (box 2) and linear HDR image 2 (box 4) by the composition of the following 3 operations:

1. Scaling (multiplying all pixel values by a common factor);
2. Quantization (i.e., in practice rounding to the closest integer value); and
3. Clamping (i.e., replacing values above a given threshold M_white with the value M_white).

In FIGS. 4A-1, 4A-2 and 4A-3, for one training step, i.e. one optimization iteration, a single simulated LDR image is made from a given HDR image.

However, there are many more iterations than HDR images in the training set, so a given HDR image is used several times during the training.

Each time the HDR image is used, it yields a different LDR image, because generation of the LDR image depends on the random exposure shifts, which is different at each iteration. In our implementation we train the neural network for 60,000 iterations, and the training set has about 1600 training examples, so a given HDR image is used about 38 times during training.

3.1. HDR Training Dataset

Real life data is collected by the HDR sensor, and the HDR sensor can output:

a single raw linear HDR image, for example by setting the HDR sensor to produce a linear HDR image when collecting HDR data for the training dataset;

or a set of "n" raw linear LDR images (to be fused into a single linear HDR image), which exposures are selected such that a combined dynamic range of the "n" linear LDR images would cover the same dynamic range as the single HDR image.

Remark that in both cases we can still save the training dataset on the hard drive as linear HDR images instead of sets of n LDR images. In such a case, we would avoid the process of generating the linear HDR image from the n LDR images during training, which could save processing time. On the other hand, a set of tonemapped LDR images takes less space on the hard drive than the corresponding linear HDR image, because image compression algorithms are designed for tonemapped LDR images.

Also if the time to load data from the hard drive is significant in the training pipeline, then using the set of n LDR images would be more advantageous. On the other hand if the conversion from the set of LDR images to the linear HDR image takes more time, then it would be better to store the linear HDR image directly, to avoid generating it during training.

For example, JPEG images are convenient to save disk space and time when loading training examples, rather than using the 24 bit linear images directly to make the data set.

Either the raw linear HDR image or corresponding "n" raw linear LDR images may be used to create the training dataset. When corresponding "n" raw linear LDR images are used, they need to be combined (fused) into the single linear HDR image, as will be described in detail in the sub-section Latent HDR Image below.

The advantage of fusing the LDR images ourselves instead of letting the HDR image sensor do it, is that we may use a better fusion algorithm than the one used by the HDR sensor.

Either way, the linear HDR image for the training dataset is formed, either as a direct output of the HDR sensor, or as a fusion of n LDR images outputted by the HDR sensor.

In one embodiment, the HDR image data takes the form of three LDR JPEG images that are combined at training time to form a linear HDR color image. This combination could also be done at the dataset creation as mentioned above.

Preferably, each LDR image is captured as JPEG image, which is transformed into a linear LDR image by:
  (i) Scaling, or multiplying all pixel values by a common factor;
  (ii) Quantization, i.e., in practice rounding to the closest integer value; and
  (iii) optionally Clamping, i.e., replacing values above a given threshold M_white with the value M_white;

followed by combining n linear LDR images into a single linear HDR (Ihdr) image taking into account weighted average of pixel values across "n" LDR images with weight equal to the inverse of the noise variance.

The training dataset has 1600 pairs of HDR images that have been acquired using a test vehicle and the Sony IMX490 HDR image sensor. Each pair of HDR images contains two successive frames of which the second one has been manually annotated for automotive 2D object detection. About 50% of the HDR images have been taken during day time, 20% at dusk and 30% at night time, with diverse weather conditions. The driving locations include urban and sub-urban areas, countryside roads and highways. The raw HDR data has been processed by a state-of-the-art ARM Mali C71 ISP to obtain 3 LDR images. Those images are rescaled to the definition of the target image sensor (Sony IMX249) and saved in the sRGB color space.

3.2 LDR Image Capture Simulation

The proposed training pipeline simulates LDR raw images 1 and 2 from corresponding HDR images 1 and 2 from the training dataset 1.

Figures 1, 4A:
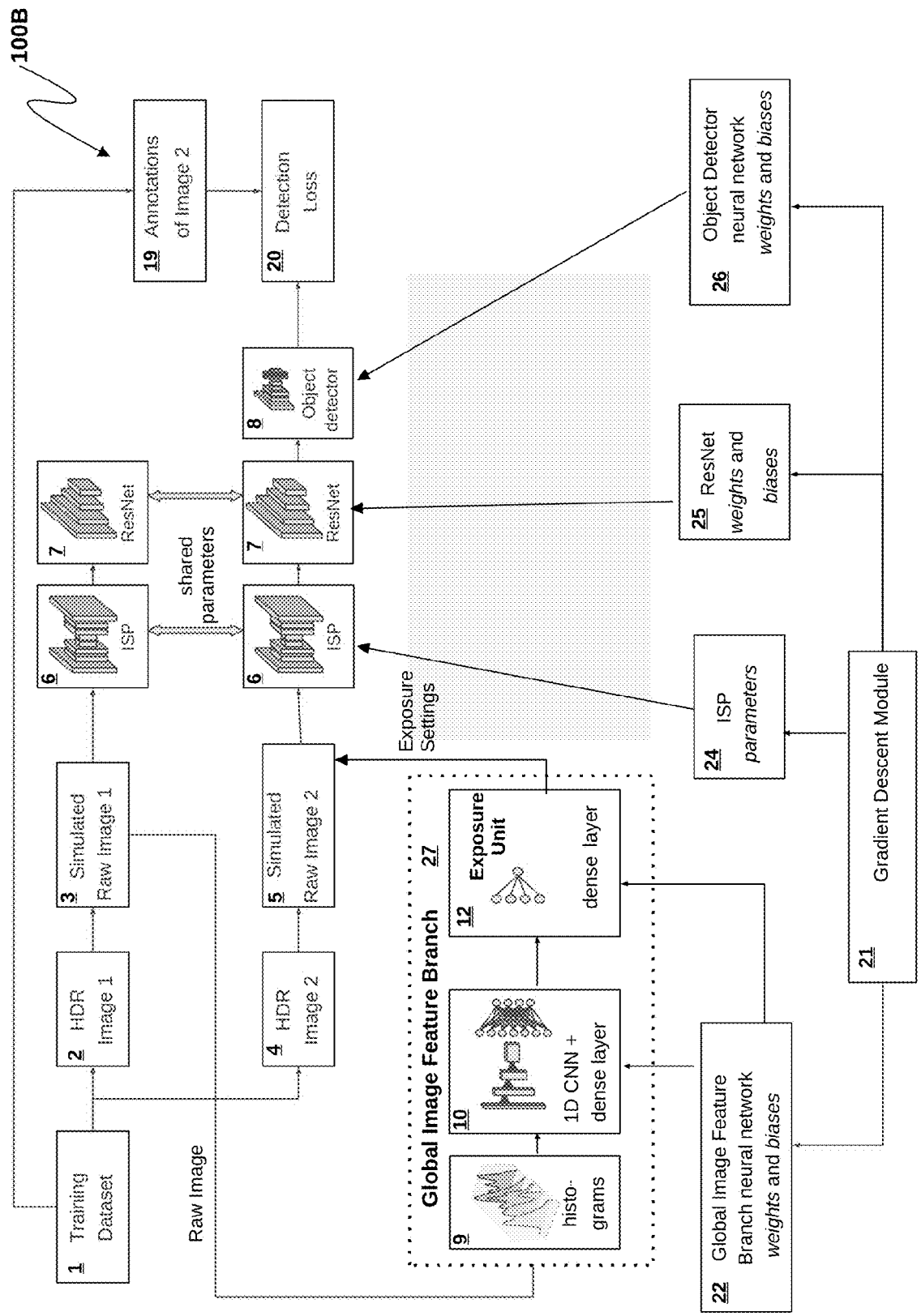
Figures 2, 4A:
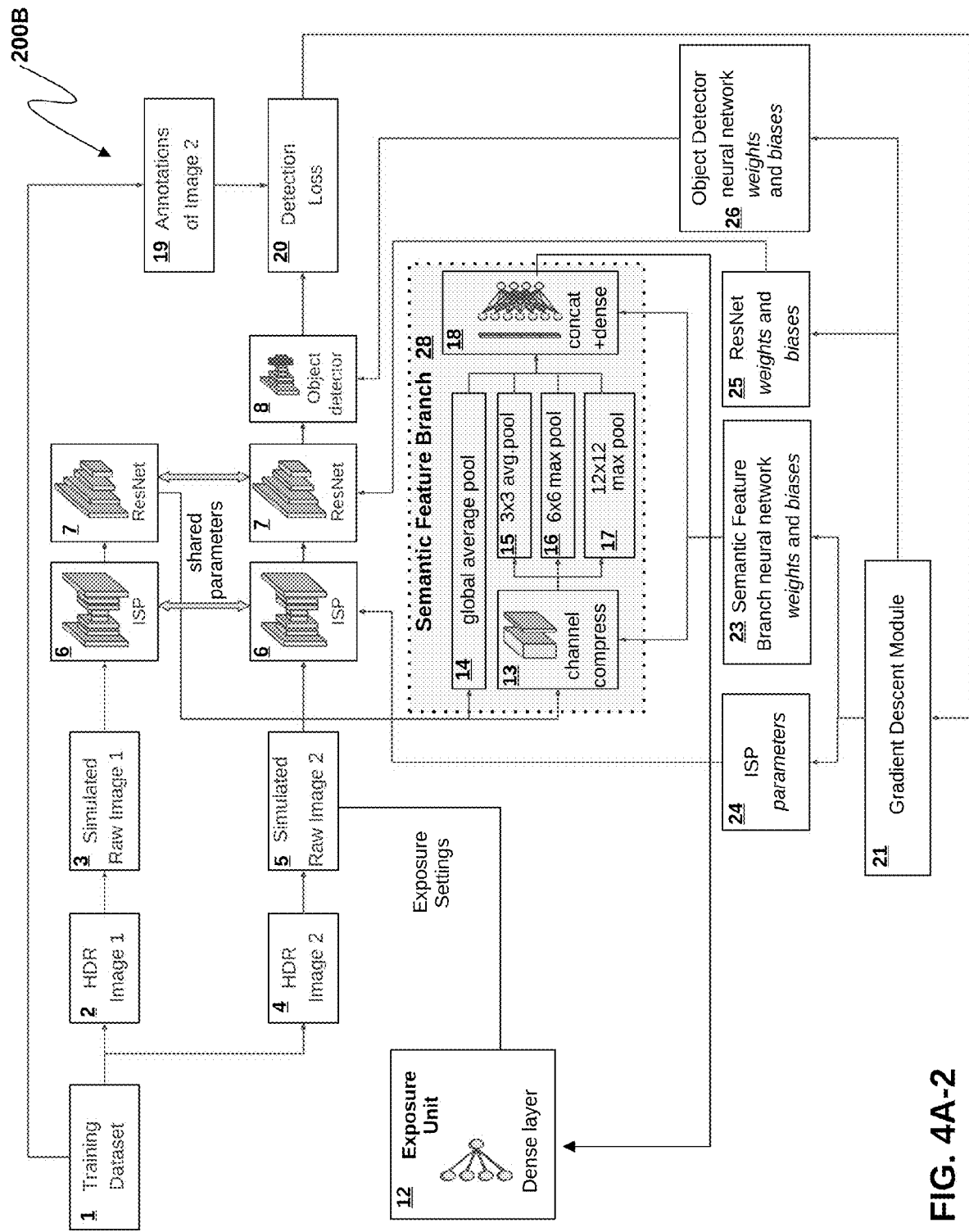
Figures 3, 4A:
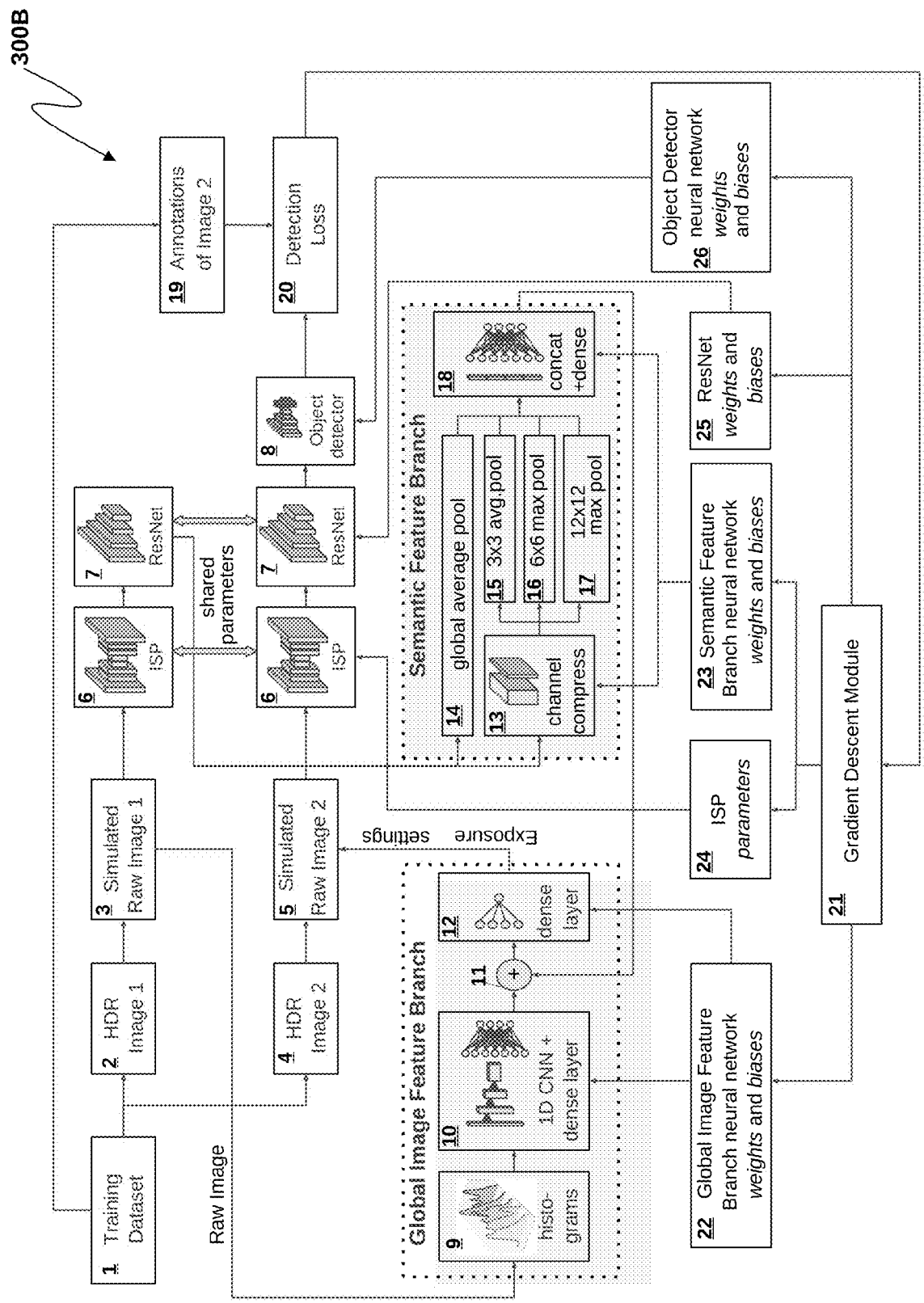
Figures 1, 4B:
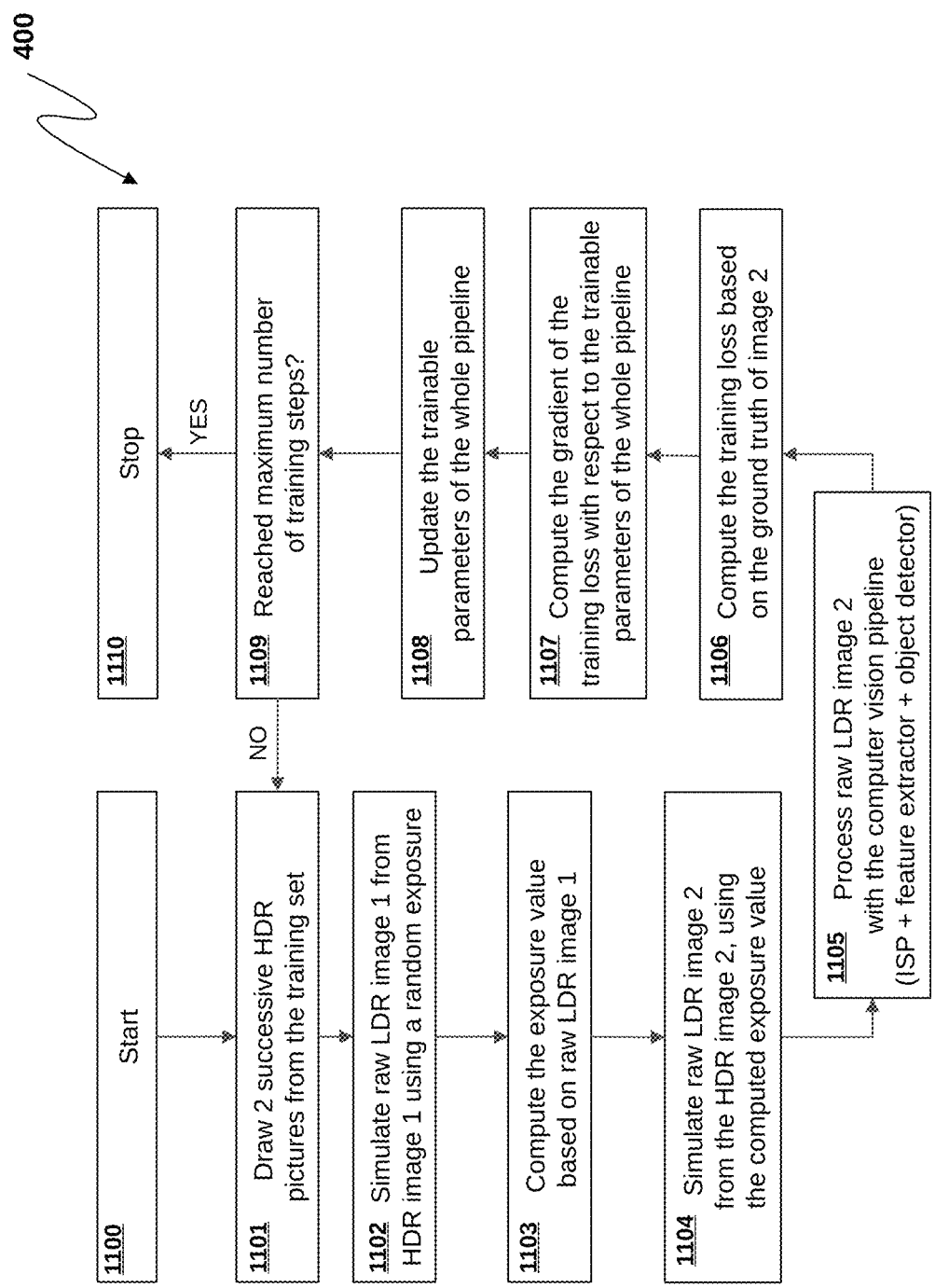
Figures 2, 4B:
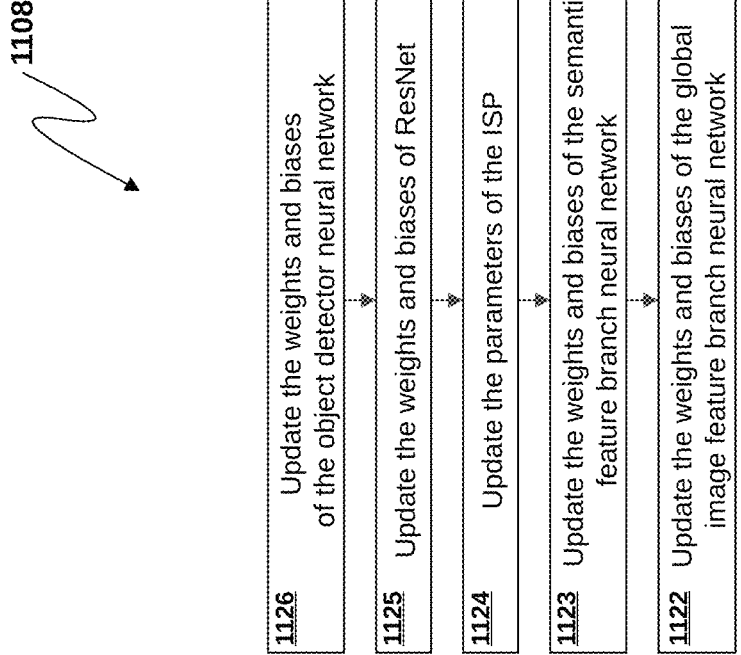

The LDR image formation is shown in FIGS. 4A-1, 4A-2 and 4A-3 in boxes 3 and 5, and in FIG. 4B-1 in boxes 1102 and 1104. We also provide additional details below.

The AEC model is trained on LDR raw images simulated using the image formation model from Sec. 3. Specifically, we calibrate the sensor noise parameters and use them to set a camera gain K and exposure time, t. The camera comprises the camera optics 32 and the LDR sensor 34, and the gain K here is the gain setting of the LDR sensor 34.

The radiant power $\phi$ for each pixel of the LDR image is simulated using HDR images taken by a 140 dB HDR camera. This is done by taking n JPEG encoded LDR images whose combined dynamic range covers the full 140 dB of the HDR image. n LDR images correspond to a single HDR image, these n LDR images are taken by the HDR image sensor. This HDR sensor can either output these n LDR images which can then be combined ("fused") into an HDR image, as described in the present application, or the HDR sensor can output an HDR image by doing the fusion of the LDR images to an HDR image internally.

More specifically, for each LDR image $J_i$, the scaled linear image is, $I_i = \alpha_i \cdot \varphi(J_i)$. Here the exposure factor $\alpha_i = (K_i \cdot t_i)^{-1}$ is decreasing with i, and $\varphi$ is the inverse tonemapping operator to recover a linear image in [0, 1]. Hence, each scaled image $I_i$ has values in the range $[0, \alpha_i]$.

Radiant power simulation is done at the training stage, when simulating an LDR captured image. It is essentially a scaling of the linear HDR image (from the training dataset) by a factor common to all pixels of the images. This scaling accounts for the exposure of the simulated captured image to a base exposure followed by a random exposure shift.

The base exposure is such that the image is more or less well exposed, following a simple heuristic. It is a scaling that can also be done offline, i.e., before training, just by doing the corresponding scaling for each of the linear HDR images before saving them to disk in the training dataset (i.e., at training set creation).

The random exposure shift, on the other hand, is freshly sampled at each training step, such that a given training image can be used for several training steps with different exposure shifts. So the random exposure shift can only be done during training. It is essentially a challenge to the auto-exposure module 12 to train it to adapt to ill-exposed images.

We simulate LDR images rather than use LDR images produced by the HDR sensor for two reasons:

1. For the first image, a Simulated Raw Image 1, of the two images of the mini-sequence of the training example of FIGS. 4A1-, 4A2 and 4A3 which will be described in detail below, we want to apply a random exposure shift, where the exposure shift is randomly sampled within a predetermined range. This can only be done with simulation. If we used one of the n LDR images recorded by the HDR sensor, we would be limited to these exposures only, whereas the simulation allows an infinite number of possible exposures.

2. For the second image, a Simulated Raw Image 2 of FIGS. 4A1-, 4A2 and 4A3, we need to have an image that would result from the capture made with the exposure setting computed by applying the auto-exposure module to the first image Simulated Raw Image 1, and this can only be achieved by simulation. It is very unlikely that one of the n LDR images recorded by the HDR sensor would exactly match the exposure predicted by the auto-exposure module.

Latent HDR Image. A linear HDR image $I_{hdr}$ is produced from the n scaled linear LDR image images by computing the minimum variance unbiased estimator, i.e., the weighted average of pixel values across the set of n LDR images with weights equal to the inverse of the noise variance, $$I_{hdr} = \frac{\sum_{i=1}^{n} w_i \cdot I_i}{\sum_{i=1}^{n} w_i} \text{ with } I = \frac{\delta_{I_i < M_{white}}}{\alpha_i^2 \cdot V_{unsat}} \quad (7)$$

where $V_{unsat}$ is the variance of unsaturated pixels.

Radiant Power Simulation. We simulate the radiant power per pixel $\phi_{sim}$ with the help of the linear HDR image $I_{hdr}$ described above, $\phi_{sim}$:=Bayer $(\gamma \cdot I_{hdr})$. Here Bayer is the Bayer pattern sampling of the image sensor. The constant $\gamma$ allows to scale the values to a range that is appropriate for the given camera.

3.3 Noise Simulation

In the FIGS. 4A-1, 4A-2, 4A-3, 4B-1 and 4B-2, the noise simulation takes place in the same boxes as the LDR image capture simulation, even though details about noise simulation are not shown on those Figures. More specifically, FIG. 4B-2 outlines the details for box 1108 from FIG. 4B-1, namely how to update the trainable parameters of the whole pipeline.

Sensor noise is simulated at training time to match the noise distribution of the target LDR sensor. Since the dataset images already contain some noise, we add only the amount that reproduces noise characteristics of the target sensor through noise adaptation. We also apply noise augmentation for each training example by randomly varying the strength of the simulated noise around the noise strength targeted by noise adaptation.

In further detail, noise simulation is done at the training stage, when simulating an LDR captured image. This is done by sampling a random variable that follows the probability distribution of the noise of the targeted sensor.

The probability distribution has been estimated ("calibrated") beforehand. It cannot be done at training dataset creation, because it depends on the random exposure shifts, which is different at each training step. In addition it is better to sample a fresh new noise for each training step. Using the same noise at several training steps could lead to overfitting to that particular noise.

Noise Parameterization for Calibration and Capture Simulation. For the purpose of calibration and simulation we combine $\mu_i$, $\mu_0$ and $\sigma_{pre}$ to a single term $\sigma_d^2$, which we call the variance of the dark noise, as follows:

$$\sigma_d^2 = \mu_I \cdot t + \mu_0 + \sigma_{pre}^2.$$

We do this for two reasons. The first reason is that we consider the exposure time as being fixed in the training pipeline, i.e. that the AEC only adjusts the gain. This is an approximation which ignores that the camera gain setting K is bounded from below by 1. This approximation overestimates the standard deviation of the noise in the case where K<1 is simulated. However, in the case of the target camera, the error induced by that approximation is bounded from above by $0.54 \cdot M_{white}$, such that we deem this approximation as acceptable in practice. The second reason for grouping those noise terms under $\sigma_d^2$ is that we do the common approximation of replacing the Poisson distribution of dark currents electrons $y_d(\mu_d)$ by a gaussian distribution, which allows to simulate all the dark noise created before amplification as a single gaussian random variable with a variance $\sigma_d^2$ which is the sum of $\sigma_{pre}^2$ and of the variance of $y_d(\mu_d)$. For the target sensor (Sony IMX249) we also need to consider a noise that takes the form of horizontal lines on the images. This leads us to break down the variance of the dark noise $\sigma_d^2$ into two terms: $\sigma_d^2 = \sigma_{d,pix}^2 + \sigma_{d,line}^2$, where $\sigma_{d,line}^2$ is the variance of the component of the dark noise that shows up as horizontal lines and $\sigma_{d,pix}^2$ the variance of the component of the dark noise that is spatially uncorrelated.

Noise Calibration. Following the parameterization introduced in the paragraph above and in Section 1.1, we need to calibrate the following noise parameters: $\sigma_{d,pix}$, $\sigma_{d,line}$, $\sigma_{post}$ and $g_1$. The parameter $g_1$ is not a standard deviation but it characterizes the camera shot noise. We recall that $g_1$ is the gain from electrons to DN (digital numbers) at ISO 100 (i.e. when K=1), such that, in the general case, the gain g can be written $g = g_1 \cdot K$. The signal independent noise can be calibrated from a set of dark frame captures (raw images) taken at various gains. The variance of that noise can be written as $K^2 \cdot g_1^2 \cdot \sigma_d^2 + \sigma_{post}^2$, such that a regression against $K^2$ allows to estimate $g_1^2 \cdot \sigma_d^2$ and $\sigma_{post}^2$. In the case of the target camera we find out that $\sigma_{post}^2$ is negligible. Then $g_1^2 \cdot \sigma_{d,line}^2$ is estimated using the dark frames averaged along the rows. From $g_1^2 \cdot \sigma_d^2$ and $g_1^2 \cdot \sigma_{d,line}^2$ we deduce $g_1^2 \cdot \sigma_{d,pix}^2$. Once $g_1^2 \cdot \sigma_{d,pix}^2$ and $g_1^2 \cdot \sigma_{d,line}^2$ have been calibrated, the gain $g_1$ is estimated from raw images of a set of pictures of a color checker chart, taken at various gains under a roughly uniform illumination. The temperature of the illuminant does not matter. The mean value of each patch pixel is estimated using a local polynomial estimator within the pixel's patch.

Noise Adaptation. The model is trained with images that contain noise distributed as the noise created by the target camera. The training dataset is composed of images taken with the Sony IMX490. As such they already contain noise produced by that sensor. Noise adaptation is performed during training from the source camera sensor (Sony IMX490) to the target camera sensor (Sony IMX249). This consists in adding just the right amount of noise to the image such that after noise adaptation the noise contained in the image matches the distribution of the noise of the target camera. The noise distributions of both the source and target camera need to be calibrated. The approach exposed above is used to achieve those calibrations, even though the induced noise model is only an approximation here. The images of the training set have been rescaled to match the definition of the target camera. For a given pixel in an (HDR) image of the training set, there is a mean number of photo-induced electrons $\mu_{p,source}$. Suppose the exact same scene was taken with the target camera from the exact same point of view. Then for the corresponding pixel in the resulting raw image, there is a mean number of photo-induced electrons $\mu_{p,target}$. It is assumed that $\mu_{p,source} = \mu_{p,target}$ when the camera gain settings K=1 for the target camera. This can be realized in practice by adjusting the aperture and exposure time of the target camera given that the images of the training set have all been taken with the same fixed exposure settings. Those adjustments are based on the aperture and exposure time of the source camera, as well as the pixel sizes and the quantum efficiencies of both the source and target sensors. The assumption $\mu_{p,source} = \mu_{p,target}$ implies that to simulate a raw image for the target camera from the source camera it is required to multiply the raw pixel value of the source camera by $g_{source}^{-1} \cdot g_{target}$. Here $g_{source}$ and a $g_{target}$ are the quantities corresponding to the gain g introduced in Section 3, for the source and target cameras respectively. However the resulting simulated raw image still does not include noise adaptation for the dark noise.

To complete noise adaptation the dark noise of the target camera is matched. Assuming $\sigma_{d,source}^2$ and $\sigma_{d,target}^2$ are the variances of the dark noise for the source and the target cameras, a gaussian noise of variance $\sigma_{sim}^2$ is added to the pixel values, that is $$\sigma_{sim}^2 = g_{target}^2 \cdot (\sigma_{d,target}^2 - \sigma_{d,source}^2).$$

This is only possible if $\sigma_{d,source} < \sigma_{d,target}$, which is the case for the chosen source and target sensors. For the special case of a target sensor that includes an horizontal line noise as described above, both spatially uncorrelated and horizontal line noises with corresponding variances are added, computed as follows $$\sigma^2_{sim,pix} = g^2_{target} \cdot (\sigma^2_{d,target} - \sigma^2_{d,pix}),$$

$$\sigma^2_{sim,line} = \sigma^2_{d,line}.$$

Noise Augmentation. For the purpose of data augmentation, the method departs slightly from the way noise adaptation is outlined above. The strength of the simulated dark noise is randomly varied around the strength targeted by noise adaptation. More precisely, $\sigma_{sim}$ is computed as $$\sigma_{sim} = \max(0, g^2_{target} \cdot (\sigma^2_{d,target} \cdot k_{aug} - \sigma^2_{d,source})).$$

where log ($k_{aug}$) is sampled uniformly in [log (0.25), log (4)] and set to the same value for all the pixels of a given image pair example. In the case of a target sensor that includes a horizontal line noise, the noise augmentation is applied as follows.

$$\sigma^2_{sim,pix} = g^2_{target} \cdot (\sigma^2_{d,target} \cdot k_{aug} - \sigma^2_{d,pix}),$$

$$\sigma^2_{sim,line} = \sigma^2_{d,line} \cdot k_{aug}.$$

3.4 Network Training

During training, a single example is made of two consecutive frames (or not distant frames, closely following each other) forming a mini sequence along with bounding boxes and classes annotation for the second frame. The HDR training images 1 and 2 are shown in FIGS. 4A-1, 4A-2 and 4A-3 in boxes 2 and 4 respectively. The annotation of the HDR image 2 is represented with box 19 of FIGS. 4A-1, 4A-2 and 4A-3.

Training pipeline. The full end-to-end training pipeline of FIGS. 4A-1, 4A-2 and 4A-3 with learned AEC and object detection has the following six steps.

First, a 12 bit capture of the first frame with Simulated Raw Image 1 with a random exposure is simulated (FIGS. 4A-1, 4A-2 and 4A-3 box 3, FIG. 4B-1 box 1102). The random exposure $e_{rand}$ is shifted from a base exposure $e_{base}$ by a shift factor $\kappa_{shift}$, i.e. $e_{rand} = \kappa_{shift} \cdot e_{base}$. The base exposure $e_{base}$ is computed adaptively from the HDR frame pixel values as $e_{base} = 0.5 \cdot M_{white} \cdot (\gamma \cdot \bar{I}_{hdr})^{-1}$, with $\bar{I}_{hdr}$ the mean value of $I_{hdr}$. The logarithm of $\kappa_{shift}$ is sampled uniformly in [log 0.1, log 10].

We then predict an exposure change with the proposed network using the given frame as input (FIGS. 4A-1, 4A-2 and 4A-3 boxes 9-18 of Global Image Feature Branch 27 and Semantic Branch 28, FIG. 4B-1 box 1103), and we simulate a 12 bit capture of the next frame with Simulated Raw Image 2 with this adjusted exposure (FIGS. 4A-1, 4A-2 and 4A-3 box 5, FIG. 4B-1 box 1104). The resulting Simulated raw image 2 frame is then processed by an ISP 6 first (FIGS. 4A-1, 4A-2 and 4A-3 box 6, FIG. 4B-1 box 1105).

The output RGB image of the ISP 6 is fed to a feature extractor, ResNet 7 (FIGS. 4A-1, 4A-2 and 4A-3 box 7, FIG. 4B-1 box 1105). From those features an object detector 8 predicts objects classes and bounding boxes (FIGS. 4A-1, 4A-2 and 4A-3 box 8, FIG. 4B-1 box 1105).

The entire imaging and detection pipeline is supervised with the object detector loss at the end (FIGS. 4A-1, 4A-2 and 4A-3 box 20, FIG. 4B-1 box 1106).

The rest of the modules/boxes in FIGS. 4A-1, 4A-2 and 4A-3 is similar to those of FIGS. 3A-1, 3A-2 and 3A-3, except the Training Stage(s) 100A, 200A, 300A being replaced with the Gradient Module 21. The two instances of ResNet 7 and the ISP instances 6, processing the Simulated Raw Image 1 and Image 2 respectively, share their weights.

Object Detector Loss. The object detector loss $L_{OD}$ is the weighted sum of the region proposal network (RPN) loss, $L_{RPN}$, the second-stage loss, $L_{SS}$, and a penalty on the $L^2$ norm of the weights of the AE neural network, $L_{penalty}$. That is, the total loss is $$L_{OD} = L_{RPN} + L_{SS} + \lambda_{penalty} \cdot L_{penalty}.$$

Second Stage Loss. The second-stage loss $L_{SS}$ is a sum of losses $L_{RoI}$, one for each of the regions of interest (RoI) output by the RPN. The loss $L_{RoI}$ is defined in the prior art Girshick [17] et al. as $$L_{RoI}(p, u, t^u, v) = \lambda_{SS,cls} L_{cls}(p, u) + \lambda_{SS,loc}[u \geq 1] L_{loc}(t^u, v).$$

The prior art describes a Fast R-CNN network having two sibling output layers. The first outputs encompass a discrete probability distribution (per RoI), $p=(p_0, \ldots, p_K)$, over K+1 categories. As usual, p is computed by a softmax over the K+1 outputs of a fully connected layer. The second sibling layer outputs bounding-box regression offsets, $t^k=(t_x^k, t_y^k, t_w^k, t_h^k)$, for each of the K object classes, indexed by k. We use the parameterization for $t^k$ given in Girshick et al. (CVPR 2014), in which $t^k$ specifies a scale-invariant translation and log-space height/width shift relative to an object proposal. Each training RoI is labeled with a ground-truth class u and a ground-truth bounding-box regression target v. A multi-task loss $L_{RoI}$ is used on each labeled RoI to jointly train for classification and bounding-box regression, in which $L_{cls}(p, u) = -\log p_u$ is log loss for true class u. The second task loss, $L_{loc}$, is defined over a tuple of true bounding-box regression targets for class u, $v=(v_x, v_y, v_w, v_h)$, and a predicted tuple $t^u=(t_x^u, t_y^u, t_w^u, t_h^u)$, again for class u. The Iverson bracket indicator function [u≥1] evaluates to 1 when u≥1 and 0 otherwise. By convention the catch-all background class is labeled u=0.

For background RoIs there is no notion of a ground-truth bounding box and hence $L_{loc}$ is ignored. For bounding-box regression, we use the loss $$L_{loc}(t^u, v) = \sum_{i \in \{x,y,v,w,h\}} smooth_{L_1}(t_i^u - v_i),$$

in which $$smooth_{L_1}(x) = \begin{cases} 0.5x^2 & \text{if } |x| < 1 \\ |x| - 0.5 & \text{otherwise} \end{cases}$$

is a robust $L_1$ loss.

RPN Loss. The RPN loss $L_{RPN}$ is defined in another prior art Ren et al. [50] as $$L_{RPN}(\{p_i\}, \{t_i\}) = \lambda_{RPN,cls} \frac{1}{N_{cls}} \sum_i L_{cls}(p_i, p_i^*) + \lambda_{RPN,reg} \frac{1}{N_{reg}} \sum_i p_i^* L_{reg}(t_i, t_i^*).$$

Here, i is the index of an anchor in a mini-batch and $p_i$ is the predicted probability of anchor i being an object. The ground-truth label $p_i^*$ is 1 if the anchor is positive, and is 0 if the anchor is negative. $t_i$ is a vector representing the 4 parameterized coordinates of the predicted bounding box, and $t_i^*$ is that of the ground-truth box associated with a positive anchor. The classification loss $L_{cls}$ is log loss over two classes (object vs. not object). For the regression loss, we use $L_{reg}(t_i, t_i^*) = R(t_i - t_i^*)$ where R is the robust loss function (smooth $L_1$) defined in Girshick et al. The term $p_i^* L_{reg}$ means the regression loss is activated only for positive anchors ($p_i^* = 1$) and is disabled otherwise ($p_i^* = 0$).

All steps are implemented with TensorFlow graphs such that the auto-exposure network can be trained based on the object detector loss. The trainable parameters of the whole pipeline are updated (FIGS. 4A-1, 4A-2 and 4A-3 boxes 22-26, FIG. 4B-1 box 1108) following the stochastic gradient descent with momentum optimization algorithm. The gradient computation step appears in FIGS. 4A-1, 4A-2 and 4A-3 as box 21 and in FIG. 4B-1 as box 1107.

FIGS. 4B-1 and 4B2 illustrate the high-level operational flow-chart corresponding to the system diagrams of FIGS. 4A-1. 4A-2 and 4A3.

In the method 400 of FIG. 4B1, upon start (box 1100) first and second successive HDR images (HDR image 1 and HDR image 2), from two successive frames are retrieved (box 1101), followed by simulating a raw LDR image 1 from the respective HDR image 1 using a random exposure as described in detail above.

A predicted, improved exposure value for the raw LDR image 1 is computed using input from at least one of the Semantic Feature Branch 28 and/or the Global Image Feature Branch 27 (box 1103) as described in detail above.

Next, the predicted exposure value from box 1103 is used for simulating a raw LDR image 2 from the HDR image 2 (box 1104), followed by processing the raw LDR image 2 with the computer vision pipeline including the ISP 6, feature extractor Resnet 7 and objection detector 8 (box 1105).

Upon computing a training loss based on the ground truth of the processed image 2 (box 1106) and the gradient of the training loss with respect to the trainable parameters of the entire pipeline (box 1107), update the trainable parameters for the entire pipeline (box 1108).

If the maximum predetermined number of training steps has been reached (exit Yes from box 1109), the method 400 is terminated (box 1110). Otherwise (exit No from box 1109), the method returns back to the step 1001 for selecting another pair of successive HDR images and repeating the steps 1102-1109.

FIG. 4B-2 shows the step 1108 of FIG. 4B1 in more detail, namely indicating the update of weights and biases of the object detector neural network (box 1126), the updated of the weights and biases of ResNet 7 (box 1125), the update of the parameters of the ISP (box 1124), the update of the weights and biases of the semantic feature branch neural network (box 1123), and the update of the weights and biases of the global image feature branch neural network (box 1122).

Pretraining. The feature extractor has first been pretrained on ImageNet (ILSVRC2012). Then the object detector has been pretrained jointly with the ISP on several public and proprietary automotive data sets. This trained joint model (ISP+object detector) is reused as a starting point for the training of the two baselines and the two proposed models.

Learning Rate Schedule. For each of the two baselines and the two proposed models, the learning rate schedule is the same. The training is done for 20,000 steps with a learning rate 0.0003, then an additional 20,000 steps with a learning rate 0.0001 and finally 20,000 more steps with a learning rate 0.00003.

Training Hyperparameters. A batch size of 1 is used. The localization and objectness loss weights of the RPN are 4 and 3 ($\lambda_{RPN,reg}$ and $\lambda_{RPN,cls}$ respectively), the localization and classification loss weights of the second stage are 4 and 2 ($\lambda_{SS,reg}$ and $\lambda_{SS,cls}$ respectively). The number of proposals from the RPN is 300. A $L_2$ regularization is used for the weights of the auto-exposure neural network only, with weight $\lambda_{penalty} = 0.0\,001$.

Two stage training for the hybrid model. The hybrid model is trained in two stages. We first train the semantic feature branch alone. Next, we add the global image feature branch to the network to make the full hybrid model and we repeat the training, following the same training procedure, including the same learning rate schedule.

However, it is understood that a different training mode may be also applied, for example, both global feature branch 27 and the semantic branch 28 may be trained jointly.

4. Evaluation

In the step of evaluation, the proposed learned auto-exposure method is assessed and compared to existing baseline algorithms. Evaluating auto-exposure algorithms requires image acquisition with the predicted exposure, or a simulation of the capture process. First, the method is validated on capture simulations in Table 3. For experimental comparisons in Table 4, completely separate camera systems were employed, each controlled by different auto-exposure algorithms in real-time, and mounted side-by-side in a capture vehicle. The proposed method outperforms existing autoexposure methods both in simulation and experimentally.

4.1 Annotation Process

General Requirements

For training and evaluation of street objects are grouped into 6 categories, namely, Car/Van/SUV, Bus/Truck/Tram, Bike, Person, Traffic Sign, Traffic Lights. The Car/Van/SUV category is mainly for light to medium sized vehicles, while Bus/Truck/Tram includes medium to heavy duty vehicles, such as, construction vehicles. The Bike category includes bicycles, motorcycles and any other light transportation that have similar shape to a bicycle or motorcycle. Person category includes pedestrians, cyclists and their full extent is annotated. For groups of people, every individual is annotated separately. Traffic sign includes all standard traffic sign categories including electronic signs, and Traffic lights include lights for vehicles, public transports, pedestrians and cyclists. For all annotations only the visible extent of the objects are annotated as tightly as possible. Objects smaller than 5×5 pixels are ignored.

Annotation Requirements for Live Evaluation Data

For live evaluation, captures were obtained by running two different auto exposure algorithms on a stereo pair. The main challenge while annotating these LDR images is that some of the regions can be either underexposed or overexposed. However, due to using two different algorithms, one of the two exposures are likely to have those regions properly exposed. To annotate these live evaluation data, a sequence of exposure pairs for annotation was used. The annotations for over and underexposed images were done by first trying to adjust the brightness and contrast of the images to maximize object visibility. If they are still not visible, the annotators chose the corresponding well exposed image and transferred the annotation to the badly exposed image while making sure that the annotations are spatially and temporally consistent. Each annotated sequence was checked for correctness by a quality controller and the annotations were adjusted as needed.

4.2 Synthetic Assessment

The proposed method is first evaluated by simulating scene intensity shifts using captured HDR data. To this end, a dataset of 400 pairs of consecutive HDR frames taken with the HDR Sony IMX490 sensor that was also used for capturing the training set, is used. Noise adaptation is applied, but no noise augmentation. For each pair of frame a random test exposure is simulated the same way as in the training pipeline except here κ shift is sampled with equal probabilities in the set $\{k^{-1}, k\}$, with k=1.5 for mild shifts, k=4 for moderate shifts and k=10 for large shifts. The evaluation metric is the object detection average precision (AP) at 50% IOU over the 400 pairs and their horizontal flip. For each tested AEC method and each k∈{1.5, 4, 10}, the experiments are repeated 12 times and the mean was computed, and the standard deviation of the AP score. For fair comparisons, the detector networks were fine-tuned separately for all auto-exposure baselines.

Quantitative and Qualitative Validation. The four AEC algorithms were compared, the proposed neural auto-exposure with histogram pyramid pooling only of FIG. 3A-1, the proposed neural auto-exposure with both histogram pyramid pooling and the semantic branch of FIG. 3A-3, an average-based AE algorithm of the prior art, and an AE algorithm of the prior art driven by local image gradients. The average-based AE employs an efficient, but fast scheme that adjusts the mean pixel value I mean of the current raw frame and adjusts the exposure by a factor $0.5 \cdot M_{white}/I_{mean}$. The gradient-based AE from Shim et al. aims to adjust exposure to maximize local image gradients. The proposed parameters, δ=0.06, and $K_p$=0.5 were used. Both baseline algorithms are implemented using TensorRT and runs in real-time on a Nvidia GTX 1070.

FIGS. 5A1, 5A2, 5A3, 5A4, 5A5, 5B1, 5B2, 5B3, 5B4, 5B5, 5C1, 5C2, 5C3, 5C4, 5C5, 5D1, 5D2, 5D3, 5D4 and 5D5 illustrate a comparison of the two proposed methods of the present invention and the two baselines of the prior art using simulations of mild (k=1.5) and moderate (k=4) exposure shifts. Namely, FIGS. 5A1, 5A2, 5A3, 5A4 and 5A5 show results for the prior art method of Average Auto-Exposure calculation for exposure shifts k=1.5, k=4, k=1.5, k=1.5 and k=4 respectively. FIGS. 5B1, 5B2, 5B3, 5B4 and 5B5 illustrate results for the prior art method of Gradient Auto-Exposure calculation for exposure shifts k=1.5, k=4, k=1.5, k=1.5 and k=4 respectively. FIGS. 5C1, 5C2, 5C3, 5C4, and 5C5 illustrate results for the histogram method of the FIG. 3A-1 of the present invention for exposure shifts k=1.5, k=4, k=1.5, k=1.5 and k=4 respectively. And finally, FIGS. 5D1, 5D2, 5D3, 5D4 and 5D5 illustrate results for the hybrid method of the FIG. 3A-3 of the present invention for exposure shifts k=1.5, k=4, k=1.5, k=1.5 and k=4 respectively.

As can be seen from FIGS. 5C1, 5C2, 5C3, 5C4, 5C5 and 5D1, 5D2, 5D3, 5D4, 5D5 both methods of the present invention can recover from extreme exposures in cases where the prior art methods fail.

The last column of Table 3 lists the mean average precision (mAP) of all compared algorithms across automotive classes, including bike, bus and truck, car and van, person, traffic light, and traffic sign, for each of the three exposure shift scenarios. The other column of Table 3 list the corresponding individual AP scores. These synthetic results validate the proposed method as it outperforms the two baseline algorithms for each of the 6 classes and across all three exposure shift scenarios, with a larger margin for larger shifts. For large objects, such as buses or trams, which can alter the scene illumination substantially, the proposed semantic branch provides more than 14% margin in average precision, validating the proposed architecture.

Table 3 below shows the object detection performance, that is average precision at intersection over union 0.5 (AP at IoU 0.5) for three exposure shift simulation scenarios, for 6 classes and mean AP across classes (mAP). The base exposure is shifted by a factor randomly sampled in {0.667, 1.5} for small shifts, {0.25, 4} for moderate shifts and {0.1, 10} for large shifts. Results within one standard deviation of the corresponding best result are indicated with *.

TABLE 3

Object detection performance for three simulation scenarios

| Method | Bike | Bus and Truck | Car and Van | Person | Traffic Light | Traffic Sign | mAP |
|---|---|---|---|---|---|---|---|
| Gradient AE | 17.56 | 31.26 | 60.70* | 28.92 | 21.9 | 30.07 | 31.73 |
| Average AE | 16.01 | 29.74 | 59.56 | 28.85 | 21.53 | 29.7 | 30.9 |
| Histogram NN (ours) | 19.87* | 33.11 | 60.43 | 29.55 | 22.6 | 31.42 | 32.83 |
| Semantic NN (ours) | 20.19 | 34.15 | 60.87* | 30.21* | 23.35 | 30.87 | 33.27 |
| Hybrid NN (ours) | 20.18* | 37.06 | 61.07 | 30.6 | 23.98 | 31.18* | 34.01 |
| | | | Mild exposure shift k = 1.5 | | | | |
| Gradient AE | 17.02 | 25.47 | 57.27 | 24.93 | 20.87 | 27.95 | 28.92 |
| Average AE | 15.5 | 29.09 | 58.08 | 27.17 | 21.29 | 28.63 | 29.96 |
| Histogram NN (ours) | 19.8 | 33.99 | 60.32 | 29.41 | 22.69 | 31.34* | 32.92 |
| Semantic NN (ours) | 19.76 | 32.55 | 60.72* | 30.38* | 23.5 | 31.41 | 33.05 |
| Hybrid NN (ours) | 20.29 | 37.29 | 61.22 | 30.44 | 23.95 | 31.28* | 34.08 |
| | | | Moderate exposure shift k = 4 | | | | |
| Gradient AE | 13.22 | 19.81 | 48 | 18.61 | 16.18 | 21.62 | 22.91 |
| Average AE | 12.99 | 25.1 | 53.83 | 23.81 | 18.62 | 26.3 | 26.77 |
| Histogram NN (ours) | 18.32 | 32.06 | 60.39 | 28.44 | 22.7 | 31.12 | 32.17 |
| Semantic NN (ours) | 17.65 | 26.82 | 60.19 | 28.97 | 23.2 | 30.75 | 31.26 |

TABLE 3-continued

Object detection performance for three simulation scenarios

| Method | Bike | Bus and Truck | Car and Van | Person | Traffic Light | Traffic Sign | mAP |
|---|---|---|---|---|---|---|---|
| Hybrid NN (ours) | 19.42 | 35.18 | 61.01 | 29.81 | 23.7 | 30.96* | 33.35 |
| | | | Large exposure shift k = 10 | | | | |

Comparison with Conventional HDR Detection Pipelines. In Table 4, results are provided of a synthetic comparison between object detection on the output of an HDR ISP, the ARM Mali C71 which ingests an HDR RAW image, and the proposed method using an LDR image exposed using the proposed neural exposure control. In this synthetic experiment an additional HDR data set was used. This dataset is comprised of 6319 annotated images and was also taken with the Sony IMX490 sensor. The commercial ARM Mali C71 HDR ISP is run on the HDR raw images and run the pretrained object detector mentioned in Section 3.3 on the output of that ISP. The detector was fine tuned on the post-ISP images from this HDR ISP. For comparison, a LDR capture is simulated from the previous frame HDR raw image and compute an exposure adjustment for the test frame (HDR raw image), from which a LDR capture is simulated that is processed with the trained pipeline (ISP+ object detector). For this experiment, noise adaptation nor noise augmentation is applied, as the goal is to compare the use of HDR images with the use of LDR images auto-exposed with the proposed method, but not to validate the method for a specific target camera. It can be seen from Table 4 that the use of the joint model (trained AEC+ISP+ detector) outperforms the traditional pipeline consisting of an HDR sensor followed by a conventional HDR ISP and an object detector trained on ISP-processed RGB images.

Table 4 below shows a synthetic comparison between a conventional HDR pipeline and LDR images auto-exposed with the proposed method. The reported scores are the average precision at IoU 0.5 for each of the 6 classes and the mean across classes. See text for additional details.

TABLE 4

Comparison of the object detection performances of a conventional HDR pipeline and our method

| | Classes | | | | | | |
|---|---|---|---|---|---|---|---|
| Method | All Classes | Bike | Bus & Truck | Car & Van | Person | Traffic Light | Traffic Sign |
| CONVENTIONAL HDR DETECTION | 10.6 | 3.4 | 12.9 | 29.9 | 8.8 | 2.1 | 6.4 |
| PROPOSED LDR HYBRID NN (ours) | 25.0 | 19.7 | 22.0 | 47.0 | 24.2 | 13.6 | 23.5 |

5.3. Experimental Assessment

The proposed method is validated experimentally by implementing the proposed method and best baseline AEC algorithm from the simulation section on two separate camera prototype systems that are mounted side-by-side in a test-vehicle. The captured frames from the same automotive scenes, but different camera systems, are manually and separately annotated for fair comparison.

FIGS. 6B1, 6B2, 6B3, 6B4, 6B5 and 6B6 illustrate experimental prototype results of the proposed neural AEC of FIG. 3A-3 using the hybrid method of the present invention compared to the Average AE of the prior art method shown in FIGS. 6A1, 6A2, 6A3, 6A4, 6A5 and 6A6, using the real-time side-by-side prototype vehicle capture system shown in FIGS. 9A and 9B and FIGS. 10A, 10B, 10C and 10D. As can be seen from the FIGS. 6B1, 6B2, 6B3, 6B4, 6B5 and 6B6, the proposed hybrid method accurately balances exposure of objects still in the tunnel with exposure of objects outside of the tunnel and adapts itself robustly to changing conditions.

FIGS. 7A1 to 7H4 illustrate more experimental prototype results of the proposed neural AEC of FIG. 3A-3 using the hybrid method of the present invention compared to the Average AE of the prior art method, using the real-time side-by-side prototype vehicle capture system shown in FIGS. 9A and 9B and FIGS. 10A, 10B, 10C and 10D, where:

FIGS. 7A1, 7A2, 7A3 and 7A4 illustrate images of a first set of scenes captured using the Average AE;

FIGS. 7B1, 7B2, 7B3 and 7B4 illustrate corresponding images of the first set of scenes captured using the hybrid neural AEC of the present invention;

FIGS. 7C1, 7C2, 7C3 and 7C4 illustrate images of a second set of scenes captured using the Average AE;

FIGS. 7D1, 7D2, 7D3 and 7D4 illustrate corresponding images of the second set of scenes captured using the hybrid neural AEC of the present invention;

FIGS. 7E1, 7E2, 7E3 and 7E4 illustrate images of a third set of scenes captured using the Average AE;

FIGS. 7F1, 7F2, 7F3 and 7F4 illustrate corresponding images of the third set of scenes captured using the hybrid neural AEC of the present invention;

FIGS. 7G1, 7G2, 7G3 and 7G4 illustrate images of a fourth set of scenes captured using the Average AE; and FIGS. 7H1, 7H2, 7H3 and 7H4 illustrate corresponding images of the fourth set of scenes captured using the hybrid neural AEC of the present invention.

As can be seen from FIGS. 7A1 to 7H4, the proposed method accurately balances exposure between objects and adapts itself robustly to changing conditions.

FIGS. 8A1, 8A2, 8A3 and 8A4 illustrate experimental prototype results of the Average AE baseline prior art method for a set of images/scenes, and FIGS. 8B1, 8B2, 8B3 and 8B4 illustrate experimental prototype results of the proposed hybrid neural AEC of FIG. 3A-3 for the same corresponding set of images/scenes, using the real-time side-by-side prototype vehicle capture system shown in FIGS. 9A and 9B and FIGS. 10A, 10B, 10C and 10D.

Similarly, FIGS. 8C1, 8C2, 8C3 and 8C4 illustrate experimental prototype results of the Average AE baseline prior art method for another set of images/scenes, and FIGS. 8D1, 8D2, 8D3 and 8D4 illustrate experimental prototype results of the proposed hybrid neural AEC of FIG. 3A-3 for the same corresponding another set of images/scenes, using the real-time side-by-side prototype vehicle capture system shown in FIGS. 9A and 9B and FIGS. 10A, 10B, 10C and 10D.

As can be seen from FIGS. 8B1, 8B2, 8B3, 8B4 and 8D1, 8D2, 8D3, 8D4, the proposed method of the embodiment of the present invention accurately balances exposure between objects and adapts itself robustly to changing conditions.

FIG. 9A illustrates an experimental capture setup for performing a side-by-side comparison of the hybrid method of FIGS. 3A-3 and 3B-3 and a prior art method based on average auto-exposure, for installation in an acquisition vehicle, and FIG. 9B illustrates the acquisition vehicle with the experimental capture setup of FIG. 9A.

Figure 10A:
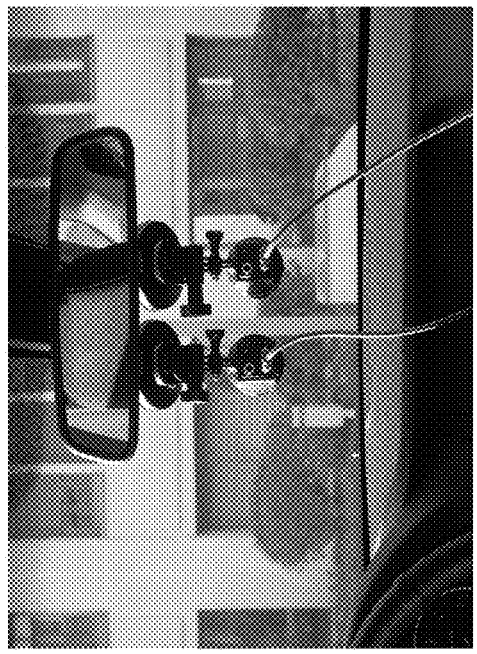
Figure 10B:
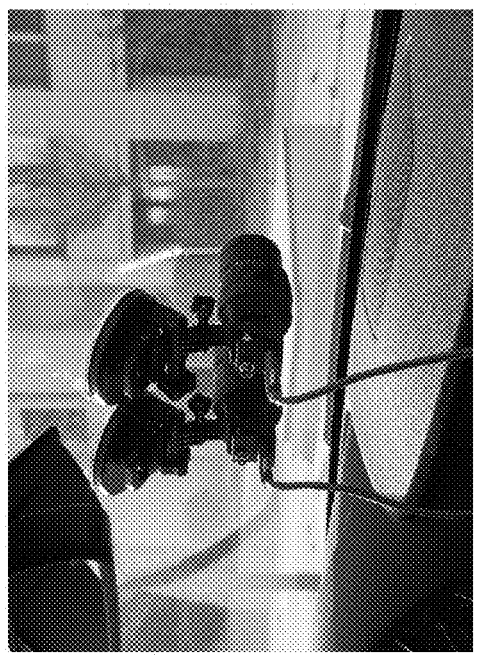
Figure 10C:
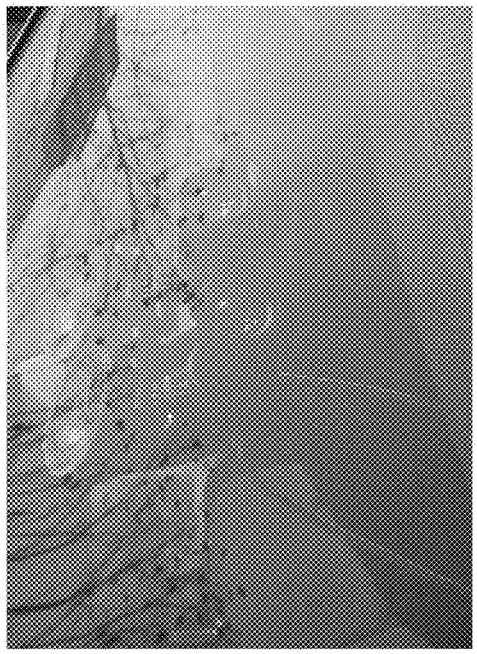
Figure 10D:
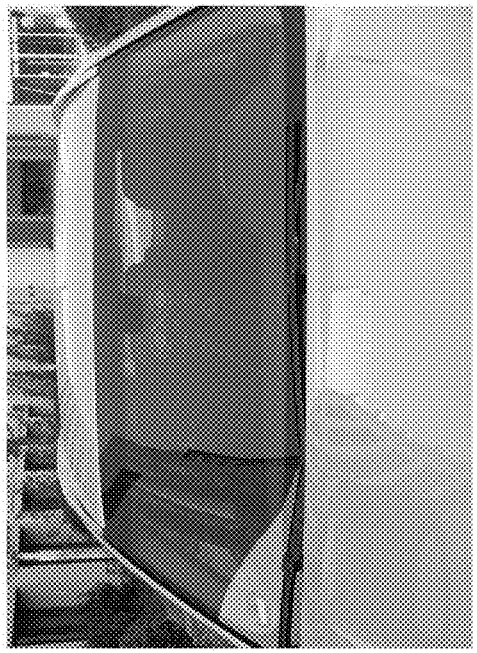

FIGS. 10A, 10B, 10C and 10D illustrates the experimental capture setup of FIGS. 9A and 9B in more detail, namely FIGS. 10A, 10B show the experimental capture setup at different angles, FIG. 10C shows the experimental setup from the outside of the vehicle, and FIG. 10D provides an enlarged partial view of the vehicle with the experimental setup attached to the windshield.

Prototype Vehicle Setup. The object detection results of the proposed method are compared with the average AEC baseline method, which performed best in the previous synthetic assessment. Each of the two cameras is free-running and takes input image streams from separate imagers mounted side-by-side on the windshield of a vehicle, see FIGS. 9A and 9B. Images are recorded with the object detector and each AEC algorithm running live. For fair comparisons, the individually fine-tuned detectors for all auto-exposure baselines are used. All compared AEC methods and inference pipelines run in real-time on two separate machines, each equipped with a Nvidia GTX 1070 GPU.

The driving scenarios are highway and urban scenarios in European cities during the daytime. Several tunnels in the test set are included to also assess conditions of rapidly changing illumination. The route is taken two times during two successive days at the same time of the day. The input to the pair of compared algorithms are swapped between the two drives, such that the algorithm receiving input from the left camera the first day receives input from the right camera the second day and conversely. A total of 3140 frames is selected for testing each AE algorithm. Frames are selected in pairs, one from each algorithm, such that they match the sampling time. The selected test frames are annotated for the same six classes as mentioned above.

Quantitative and Qualitative Validation. All separately acquired images were manually annotated by humans for the automotive classes that the models were trained for. Using these ground-truth annotations, the detection performance of each pipeline is evaluated as shown in Table 5. These results confirm the improvement in object detection using the proposed model in both simulation and real-world experiments. As mentioned above, FIG. 6 show a qualitative comparison that further validate the proposed method in challenging high dynamic range conditions. Specifically, the method is capable of carefully balancing the exposure between dark and bright objects even in rapidly changing conditions.

Table 5 below shows experimental object detection evaluation for the proposed hybrid NN with the average-based AEC method running side-by-side in the prototype vehicle from FIGS. 9A and 9B. The reported scores are the average precision at IoU 0.5 for each of the 4 classes and the mean across classes.

TABLE 5

Experimental object detection evaluation of the proposed hybrid NN and the average-based AE method running side-by-side in the prototype vehicle

| | | Classes | | | |
|---|---|---|---|---|---|
| Method | All Classes | Bike | Bus & Truck | Car & Van | Person |
| AVERAGE AE | 28.80 | 11.93 | 28.92 | 54.20 | 20.17 |
| HYBRID NN (ours) | 32.37 | 13.96 | 34.09 | 58.90 | 22.53 |

5. Conclusions

Exposure control is critical for computer vision tasks as under or overexposure can lead to significant image degradations and signal loss. Existing HDR sensors and reconstruction pipelines approach this problem by aiming to acquire the full dynamic range of a scene with multiple captures of different exposures. This brute-force capture approach has the downside that these captures are challenging to merge for dynamic objects and sensor architectures suffer from reduced fill-factor. In the present invention, the use of low dynamic range (LDR) sensors has been proposed, paired with learned exposure control, as a computational alternative to the popular direction of HDR sensors. The present invention includes a neural exposure control that is optimized for downstream vision tasks and makes use of the scene semantics to choose optimal exposure parameters. To this end, an annotated HDR training dataset and a simulation based training approach that reduces the need for difficult to obtain large annotated LDR training data is introduced. The effectiveness of the approach in simulation and experimentally in a prototype vehicle system is validated, where the proposed neural auto-exposure outperforms conventional methods by more than 5 points in mean average precision.

Methods of the embodiment of the invention may be performed using one or more hardware processors, executing processor-executable instructions causing the hardware processors to implement the processes described above. Computer executable instructions may be stored in processor-readable storage media such as floppy disks, hard disks, optical disks, Flash ROMs (read only memories), non-volatile ROM, and RAM (random access memory). A variety of processors, such as microprocessors, digital signal processors, and gate arrays, may be employed.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the methods of this disclosure.

It should be noted that methods and systems of the embodiments of the invention and data described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

REFERENCES

[1] ARM Mali C71, 2020 (accessed Nov. 11, 2020).

[2] T Asatsuma, Y Sakano, S Iida, M Takami, I Yoshiba, N Ohba, H Mizuno, T Oka, K Yamaguchi, A Suzuki, et al. Sub-pixel architecture of cmos image sensor achieving over 120 db dynamic range with less motion artifact characteristics. In Proceedings of the 2019 International Image Sensor Workshop, 2019.

[3] European Machine Vision Association. Emva standard 1288, standard for characterization of image sensors and cameras, release 3.1. 2016.

[4] Sebastiano Battiato, Arcangelo Ranieri Bruna, Giuseppe Messina, and Giovanni Puglisi. Image processing for embedded devices. Bentham Science Publishers, 2010.

[5] Michael S Brown and S J Kim. Understanding the in-camera image processing pipeline for computer vision. 2015.

[6] Vladimir Bychkovsky, Sylvain Paris, Eric Chan, and Frédo Durand. Learning photographic global tonal adjustment with a database of input/output image pairs. In CVPR 2011, pages 97-104. IEEE, 2011.

[7] Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In Proceedings of the IEEE conference on computer vision and pattern recognition, pages 3213-3223, 2016.

[8] Arnaud Darmont. High dynamic range imaging: sensors and architectures, second edition. 2019.

[9] Paul E. Debevec and Jitendra Malik. Recovering high dynamic range radiance maps from photographs. In SIGGRAPH '08, 1997.

[10] Zhushun Ding, Xin Chen, Zhe Jiang, and Cheng Tan. Adaptive exposure control for image-based visual-servo systems using local gradient information. JOSA A, 37(1): 56-62, 2020.

[11] Frédéric Dufaux, Patrick Le Callet, Rafal Mantiuk, and Marta Mrak. High dynamic range video: from acquisition, to display and applications. Academic Press, 2016.

[12] Gabriel Eilertsen, Joel Kronander, Gyorgy Denes, Rafał K Mantiuk, and Jonas Unger. Hdr image reconstruction from a single exposure using deep cnns. ACM Transactions on Graphics (TOG), 36(6):178, 2017.

[13] Konstantina Fotiadou, Grigorios Tsagkatakis, and Panagiotis Tsakalides. Snapshot high dynamic range imaging via sparse representations and feature learning. IEEE Transactions on Multimedia, 2019.

[14] Orazio Gallo, Natasha Gelfandz, Wei-Chao Chen, Marius Tico, and Kari Pulli. Artifact-free high dynamic range imaging. 2009 IEEE International Conference on Computational Photography (ICCP), pages 1-7, 2009.

[15] Andreas Geiger, Philip Lenz, and Raquel Urtasun. Are we ready for autonomous driving? the kitti vision benchmark suite. In 2012 IEEE Conference on Computer Vision and Pattern Recognition, pages 3354-3361. IEEE, 2012.

[16] Michaël Gharbi, Jiawen Chen, Jonathan T Barron, Samuel W Hasinoff, and Frédo Durand. Deep bilateral learning for real-time image enhancement. ACM Transactions on Graphics (TOG), 36(4):118, 2017.

[17] Ross Girshick. Fast r-cnn. In Proceedings of the IEEE international conference on computer vision, pages 1440-1448, 2015.

[18] Miguel Granados, Kwang In Kim, James Tompkin, and Christian Theobalt. Automatic noise modeling for ghost-free hdr reconstruction. ACM Trans. Graph., 32:201:1-201:10, 2013.

[19] Michael D. Grossberg and Shree K. Nayar. High dynamic range from multiple images: Which exposures to combine? 2003.

[20] Dong Guo, Yuan Cheng, Shaojie Zhuo, and Terence Sim. Correcting over-exposure in photographs. In 2010 IEEE Computer Society Conference on Computer Vision and Pattern Recognition, pages 515-521. IEEE, 2010.

[21] Samuel W. Hasinoff, Frédo Durand, and William T. Freeman. Noise-optimal capture for high dynamic range photography. 2010 IEEE Computer Society Conference on Computer Vision and Pattern Recognition, pages 553-560, 2010.

[22] Samuel W Hasinoff, Frédo Durand, and William T Freeman. Noise-optimal capture for high dynamic range photography. In 2010 IEEE Computer Society Conference on Computer Vision and Pattern Recognition, pages 553-560. IEEE, 2010.

[23] Kaiming He, Xiangyu Zhang, Shaoqing Ren, and Jian Sun. Deep residual learning for image recognition. In Proceedings of the IEEE conference on computer vision and pattern recognition, pages 770-778, 2016.

[24] Jun Hu, Orazio Gallo, Kari Pulli, and Xiaobai Sun. Hdr deghosting: How to deal with saturation? 2013 IEEE Conference on Computer Vision and Pattern Recognition, pages 1163-1170, 2013.

[25] S Iida, Y Sakano, T Asatsuma, M Takami, I Yoshiba, N Ohba, H Mizuno, T Oka, K Yamaguchi, A Suzuki, et al. A 0.68 e-rms random-noise 121 db dynamic-range sub-pixel architecture cmos image sensor with led flicker mitigation. In 2018 IEEE International Electron Devices Meeting (IEDM), pages 10-2. IEEE, 2018.

[26] Manuel Innocent, Angel Rodriguez, Deb Guruaribam, Muhammad Rahman, Marc Sulfridge, Swarnal Borthakur, Bob Gravelle, Takayuki Goto, Nathan Dougherty, Bill Desjardin, et al. Pixel with nested photo diodes and 120 db single exposure dynamic range. In International Image Sensor Workshop, pages 95-98, 2019.

[27] Neel Joshi, Wojciech Matusik, Edward H Adelson, and David J Kriegman. Personal photo enhancement using example images. ACM Trans. Graph., 29(2):12-1, 2010.

[28] Nima Khademi Kalantari and Ravi Ramamoorthi. Deep high dynamic range imaging of dynamic scenes. ACM Trans. Graph., 36:144:1-144:12, 2017.

[29] Nima Khademi Kalantari and Ravi Ramamoorthi. Deep hdr video from sequences with alternating exposures. Comput. Graph. Forum, 38:193-205, 2019.

[30] Nima Khademi Kalantari, Eli Shechtman, Connelly Barnes, Soheil Darabi, Dan B. Goldman, and Pradeep Sen. Patch-based high dynamic range video. ACM Trans. Graph., 32:202:1-202:8, 2013.

[31] Sing Bing Kang, Ashish Kapoor, and Dani Lischinski. Personalization of image enhancement. In 2010 IEEE Computer Society Conference on Computer Vision and Pattern Recognition, pages 1799-1806. IEEE, 2010.

[32] Sing Bing Kang, Matthew Uyttendaele, Simon A. J. Winder, and Richard Szeliski. High dynamic range video. ACM Trans. Graph., 22:319-325, 2003.

[33] Wen-Chung Kao, Chien-Chih Hsu, Chih-Chung Kao, and Shou-Hung Chen. Adaptive exposure control and real-time image fusion for surveillance systems. In 2006 IEEE international symposium on circuits and systems, pages 4-pp. IEEE, 2006.

[34] Erum Arif Khan, Ahmet Oguz Akyüz, and Erik Reinhard. Ghost removal in high dynamic range images. 2006 International Conference on Image Processing, pages 2005-2008, 2006.

[35] June-Sok Lee, You-Young Jung, Byung-Soo Kim, and Sung-Jea Ko. An advanced video camera system with robust af, ae, and awb control. IEEE Transactions on Consumer Electronics, 47(3):694-699, 2001.

[36] Siyeong Lee, Gwon Hwan An, and Suk-Ju Kang. Deep chain hdri: Reconstructing a high dynamic range image from a single low dynamic range image. IEEE Access, 6:49913-49924, 2018.

[37] Siyeong Lee, Gwon Hwan An, and Suk-Ju Kang. Deep recursive hdri: Inverse tone mapping using generative adversarial networks. In The European Conference on Computer Vision (ECCV), September 2018.

[38] Tzu-Mao Li, Michaël Gharbi, Andrew Adams, Frédo Durand, and Jonathan Ragan-Kelley. Differentiable programming for image processing and deep learning in halide. ACM Transactions on Graphics (TOG), 37(4):1-13, 2018.

[39] Tsung-Yi Lin, Michael Maire, Serge Belongie, James Hays, Pietro Perona, Deva Ramanan, Piotr Dollár, and C Lawrence Zitnick. Microsoft coco: Common objects in context. In European conference on computer vision, pages 740-755. Springer, 2014.

[40] Ce Liu. Exploring new representations and applications for motion analysis. 2009.

[41] Steve Mann and Rosalind W. Picard. Being 'undigital' with digital cameras: extending dynamic range by combining differently exposed pictures. 1994.

[42] Demetris Marnerides, Thomas Bashford-Rogers, Jonathan Hatchett, and Kurt Debattista. Expandnet: A deep convolutional neural network for high dynamic range expansion from low dynamic range content. CoRR, abs/1803.02266, 2018.

[43] Mitsuhito Mase, Shoji Kawahito, Masaaki Sasaki, Yasuo Wakamori, and Masanori Furuta. A wide dynamic range cmos image sensor with multiple exposure-time signal outputs and 12-bit column-parallel cyclic a/d converters. IEEE Journal of Solid-State Circuits, 40(12):2787-2795, 2005.

[44] Belen Masia and Diego Gutierrez. Content-aware reverse tone mapping. In 2016 International Conference on Artificial Intelligence: Technologies and Applications. Atlantis Press, 2016.

[45] Tom Mertens, Jan Kautz, and Frank Van Reeth. Exposure fusion: A simple and practical alternative to high dynamic range photography. Comput. Graph. Forum, 28:161-171, 2009.

[46] Jun Ohta. Smart CMOS image sensors and applications. CRC press, 2020.

[47] SangHyun Park, GyuWon Kim, and JaeWook Jeon. The method of auto exposure control for low-end digital camera. In 2009 11$^{th}$ International Conference on Advanced Communication Technology, volume 3, pages 1712-1714. IEEE, 2009.

[48] Jonathan B. Phillips and Henrik Eliasson. Camera Image Quality Benchmarking. Wiley Publishing, 1st edition, 2018.

[49] Erik Reinhard, Greg Ward, Summant Pattanaik, Paul E. Debevec, Wolfgang Heidrich, and Karol Myszkowski. High dynamic range imaging: Acquisition, display, and image-based lighting. 2010.

[50] Shaoqing Ren, Kaiming He, Ross Girshick, and Jian Sun. Faster r-cnn: Towards real-time object detection with region proposal networks. In Advances in neural information processing systems, pages 91-99, 2015.

[51] Simon Schulz, Marcus Grimm, and Rolf-Rainer Grigat. Using brightness histogram to perform optimum auto exposure. WSEAS Transactions on Systems and Control, 2(2):93, 2007.

[52] Pradeep Sen, Nima Khademi Kalantari, Maziar Yaesoubi, Soheil Darabi, Dan B. Goldman, and Eli Shechtman. Robust patch-based hdr reconstruction of dynamic scenes. ACM Trans. Graph., 31:203:1-203:11, 2012.

[53] Inwook Shim, Tae-Hyun Oh, Joon-Young Lee, Jinwook Choi, Dong-Geol Choi, and In So Kweon. Gradient-based camera exposure control for outdoor mobile platforms. IEEE Transactions on Circuits and Systems for Video Technology, 29(6):1569-1583, 2018.

[54] Arthur Spivak, Alexander Belenky, Alexander Fish, and Orly Yadid-Pecht. Wide-dynamic-range cmos image sensors—comparative performance analysis. IEEE transactions on electron devices, 56(11):2446-2461, 2009.

[55] Yuanhang Su and C-C Jay Kuo. Fast and robust camera's auto exposure control using convex or concave model. In 2015 IEEE International Conference on Consumer Electronics (ICCE), pages 13-14. IEEE, 2015.

[56] Yuanhang Su, Joe Yuchieh Lin, and C-C Jay Kuo. A model-based approach to camera's auto exposure control. Journal of Visual Communication and Image Representation, 36:122-129, 2016.

[57] Okan Tarhan Tursun, Ahmet Oğuz Akyüz, Aykut Erdem, and Erkut Erdem. The state of the art in hdr deghosting: A survey and evaluation. In Computer Graphics Forum, volume 34, pages 683-707. Wiley Online Library, 2015.

[58] Sergey Velichko, Scott Johnson, Dan Pates, Chris Silsby, Cornelis Hoekstra, Ray Mentzer, and Jeff Beck. 140 db dynamic range sub-electron noise floor image sensor. Proceedings of the IISW, 2017.

[59] Quoc Kien Vuong, Se-Hwan Yun, and Suki Kim. A new auto exposure and auto white-balance algorithm to detect high dynamic range conditions using cmos technology. In Proceedings of the world congress on engineering and computer science, pages 22-24. San Francisco, USA: IEEE, 2008.

[60] Trygve Willassen, Johannes Solhusvik, Robert Johansson, Sohrab Yaghmai, Howard Rhodes, Sohei Manabe, Duli Mao, Zhiqiang Lin, Dajiang Yang, Orkun Cellek, et al. A 1280×1080 4.2 µm split-diode pixel hdr sensor in 110 nm bsi cmos process. In Proceedings of the International Image Sensor Workshop, Vaals, The Netherlands, pages 8-11, 2015.

[61] Orly Yadid-Pecht and Eric R Fossum. Wide intrascene dynamic range cmos aps using dual sampling. IEEE Transactions on Electron Devices, 44(10):1721-1723, 1997.

[62] Lucie Yahiaoui, Jonathan Horgan, Senthil Yogamani, Ciaran Hughes, and Brian Deegan. Impact analysis and tuning strategies for camera image signal processing parameters in computer vision. In Irish Machine Vision and Image Processing conference (IMVIP), 2011.

[63] David X D Yang and Abbas El Gamal. Comparative analysis of snr for image sensors with enhanced dynamic range. In Sensors, cameras, and systems for scientific/industrial applications, volume 3649, pages 197-211. International Society for Optics and Photonics, 1999.

[64] Huan Yang, Baoyuan Wang, Noranart Vesdapunt, Minyi Guo, and Sing Bing Kang. Personalized exposure control using adaptive metering and reinforcement learning. IEEE transactions on visualization and computer graphics, 25(10):2953-2968, 2018.

[65] Ming Yang, Ying Wu, James Crenshaw, Bruce Augustine, and Russell Mareachen. Face detection for automatic exposure control in handheld camera. In Fourth IEEE International Conference on Computer Vision Systems (ICVS'06), pages 17-17. IEEE, 2006.

What is claimed is:

1. A computer-implemented method for determining an auto-exposure value of a low dynamic range (LDR) sensor for use in high dynamic range (HDR) object detection, the method comprising:
employing at least one hardware processor for:
forming an auto-exposure neural network for predicting exposure values for the LDR sensor driven by a downstream object detection neural network in real time;
training the auto-exposure neural network jointly, end-to-end together with (i) the object detection neural network and (ii) an image signal processing (ISP) pipeline, thereby yielding a trained auto-exposure neural network; and
using the trained auto-exposure neural network to generate an optimal exposure value for the LDR sensor and the downstream object detection neural network for the HDR object detection.

2. The computer-implemented method of claim 1, wherein the forming comprises forming a global image feature neural network.

3. The computer-implemented method of claim 1, wherein the forming comprises forming a semantic feature neural network.

4. The computer-implemented method of claim 1, wherein the forming comprises forming a Hybrid neural network, comprising both a global image feature neural network and a semantic feature neural network.

5. The computer-implemented method of claim 1, further comprising, prior to the training, forming a training dataset of images, comprising:
capturing a set of HDR images by an HDR sensor in a real life environment; and
for each HDR image from the set of HDR images, forming a corresponding linear HDR image, thereby forming the training dataset.

6. The computer-implemented method of claim 1, further comprising, prior to the training, forming a training dataset of images, comprising:
by an HDR sensor, for each HDR image captured in a real life environment, outputting "n" linear LDR images with different exposures selected so that a combined dynamic range of the "n" linear LDR images covers a dynamic range of each HDR image.

7. The computer-implemented method of claim 6, wherein the forming the training dataset further comprises fusing the "n" linear LDR images into a corresponding linear HDR image Indr.

8. The computer-implemented method of claim 7, wherein the fusing further comprises fusing taking into account a weighted average of pixel values across "n" LDR images with a weight equal to the inverse of an associated noise variance.

9. The computer-implemented method of claim 5, wherein the training further comprises simulating a simulated raw LDR image from each corresponding linear HDR image, and using the simulated raw LDR image for the training of the auto-exposure neural network.

10. The computer-implemented method of claim 9, wherein:
the training further comprises a plurality of training operations, and per each training operation of the plurality of training operations, the training comprises:
simulating first and second simulated raw LDR images derived from respective first and second linear HDR images and corresponding to two consecutive or closely following frames;
training the first simulated raw LDR image with a random exposure shift; and
training the second simulated raw LDR image with an exposure value predicted by the auto-exposure neural network based on the training of the first simulated raw LDR image.

11. The computer-implemented method of claim 9 wherein the simulating comprises scaling and quantization of each corresponding linear HDR image.

12. The computer-implemented method of claim 9, wherein the simulating further comprises simulating a radiant power per pixel Psim for each simulated raw LDR image as a Bayer pattern sampling of the linear HDR image Indr.

13. The computer-implemented method of claim 9, wherein the simulating further comprises adding noise to each simulated raw LDR image to mimic a noise distribution of the LDR sensor.

14. The computer-implemented method of claim 2, wherein the forming the global image feature neural network comprises generating histograms from a raw LDR image captured by the LDR sensor at a number of different scales, including a coarse histogram for an entire raw LDR image, and respective finer histograms for corresponding smaller sections of the raw LDR image.

15. The computer-implemented method of claim 14, wherein the generating of the histograms comprises generating histograms from one of the following:
green pixel values of the raw LDR image;
luminance pixel values of the raw LDR image;
red pixel values of the raw LDR image; and
blue pixel values of the raw LDR image.

16. The computer-implemented method of claim 14, further comprising performing one-dimensional convolution operations of the histograms, followed by dense layer operations on the results of convolution operations.

17. The computer-implemented method of claim 3, wherein the forming the semantic feature neural network further comprises:
using an output from a feature extractor ResNet from the object detection neural network as an input to the semantic feature neural network, followed by channel compression to produce a compressed feature map (CFM);
performing pyramid pooling of the CFM at different scales; and
concatenating and densely connecting the results of the pooling.

18. The computer-implemented method of claim 4, wherein the training is performed in one of the following modes:
a first mode, comprising:
training the semantic feature neural network alone;
next, adding the global image feature neural network; and
repeating training of both the global image feature neural network and the semantic feature neural network together, following the same training procedure;
or
a second mode, comprising:
training both the global image feature neural network and the semantic feature neural network jointly together.

19. The computer-implemented method of claim 1, wherein the using further comprises one or more of the following:
predicting an optimal exposure value for a next frame; and
aggregating predicted exposure values across a number of consecutive frames.

20. A system for determining an auto-exposure value of a low dynamic range (LDR) sensor for use in high dynamic range (HDR) object detection, the system comprising:
a processor, and a memory having computer executable instructions stored thereon for execution by the processor, causing the processor to:
form an auto-exposure neural network for predicting exposure values for the LDR sensor driven by a downstream object detection neural network in real time;
train the auto-exposure neural network jointly, end-to-end together with (i) the object detection neural network and (ii) an image signal processing (ISP) pipeline, thereby yielding a trained auto-exposure neural network; and
use the trained auto-exposure neural network to generate an optimal exposure value for the LDR sensor and the downstream object detection neural network for the HDR object detection.

21. A computer vision system comprising:
a low dynamic range sensor (LDR) for use in high dynamic range (HDR) object detection;
an image signal processor (ISP) for processing a raw LDR image from the LDR sensor and outputting a processed image; and
an object detection neural network for further processing the processed image from the ISP;
the computer vision system further comprising an apparatus for determining an auto-exposure value of the LDR sensor, the apparatus comprising:
a processor, and a memory having computer executable instructions stored thereon for execution by the processor, causing the processor to:
form an auto-exposure neural network for predicting exposure values for the LDR sensor driven by the object detection neural network in real time;
train the auto-exposure neural network jointly, end-to-end together with (i) the object detection neural network and (ii) the ISP, thereby yielding a trained auto-exposure neural network; and
use the trained auto-exposure neural network to generate an optimal exposure value for the LDR sensor.

* * * * *